(12) United States Patent
Traynor et al.

(10) Patent No.: US 11,265,717 B2
(45) Date of Patent: Mar. 1, 2022

(54) DETECTING SS7 REDIRECTION ATTACKS WITH AUDIO-BASED DISTANCE BOUNDING

(71) Applicant: University of Florida Research Foundation, Inc., Gainesville, FL (US)

(72) Inventors: Patrick G. Traynor, Gainesville, FL (US); Christian Peeters, Gainesville, FL (US); Bradley G. Reaves, Raleigh, NC (US); Hadi Abdullah, Gainesville, FL (US); Kevin Butler, Gainesville, FL (US); Jasmine Bowers, Gainesville, FL (US); Walter N. Scaife, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 415 days.

(21) Appl. No.: 16/357,998

(22) Filed: Mar. 19, 2019

(65) Prior Publication Data
US 2019/0297503 A1    Sep. 26, 2019

Related U.S. Application Data

(60) Provisional application No. 62/647,863, filed on Mar. 26, 2018.

(51) Int. Cl.
| | |
|---|---|
| *H04L 29/06* | (2006.01) |
| *H04W 8/06* | (2009.01) |
| *H04W 8/04* | (2009.01) |
| *H04W 12/121* | (2021.01) |
| *H04W 64/00* | (2009.01) |
| *H04L 9/32* | (2006.01) |
| *H04M 3/22* | (2006.01) |

(Continued)

(52) U.S. Cl.
CPC ......... *H04W 12/121* (2021.01); *H04L 9/3271* (2013.01); *H04M 3/2281* (2013.01); *H04W 12/0433* (2021.01); *H04W 12/50* (2021.01); *H04W 64/006* (2013.01)

(58) Field of Classification Search
CPC .......... H04M 3/2281; H04M 2242/30; H04M 2203/6027; H04W 12/50; H04W 12/12; H04W 64/006; H04W 12/121; H04W 12/0433; H04L 63/1425; H04L 9/3271
USPC ........................................................ 726/23
See application file for complete search history.

(56) References Cited

U.S. PATENT DOCUMENTS

| | | | | |
|---|---|---|---|---|
| 6,304,759 | B1 * | 10/2001 | Jiang .................. | H04W 56/0045 370/335 |
| 8,510,869 | B1 * | 8/2013 | McGrady ............... | A42B 3/046 2/410 |
| 9,332,026 | B2 * | 5/2016 | Lapsley .............. | H04L 63/1416 |
| 2005/0232424 | A1 * | 10/2005 | Dobranski ............... | H04K 1/02 380/270 |

(Continued)

*Primary Examiner* — Haresh N Patel
(74) *Attorney, Agent, or Firm* — Thomas | Horstemeyer, LLP

(57) ABSTRACT

Disclosed are various embodiments for detecting Signaling System 7 (SS7) redirection attacks by measuring call audio round trip times between phones. Such redirection attacks force calls to travel longer physical distances than usual, thereby causing longer end-to-end delay. Accordingly, various embodiments implement a distance bounding-inspired protocol that allows for securely characterizing the round trip time between two call endpoints. As a result, telephone users can reliably detect SS7 redirection attacks and protect the information contained in their calls.

20 Claims, 17 Drawing Sheets

(51) Int. Cl.
*H04W 12/50* (2021.01)
*H04W 12/0433* (2021.01)

(56) References Cited

U.S. PATENT DOCUMENTS

| | | | | |
|---|---|---|---|---|
| 2008/0056154 A1* | 3/2008 | Firestone | ............... | H04L 12/66 370/252 |
| 2010/0211787 A1* | 8/2010 | Bukshpun | ............... | H04L 9/065 713/170 |
| 2013/0057436 A1* | 3/2013 | Krasner | ............... | H04W 64/00 342/464 |
| 2013/0070607 A1* | 3/2013 | Sun | ............... | G01S 5/14 370/241 |
| 2013/0076523 A1* | 3/2013 | Kwan | ............... | G06F 19/00 340/686.6 |
| 2013/0128941 A1* | 5/2013 | Langer | ............... | G08C 23/04 375/228 |
| 2013/0322462 A1* | 12/2013 | Poulsen | ............... | H04J 3/06 370/458 |
| 2015/0067819 A1* | 3/2015 | Shribman | ............... | H04L 67/32 726/12 |
| 2016/0196152 A1* | 7/2016 | DeNeale | ............... | G06F 9/44505 713/100 |
| 2017/0126898 A1* | 5/2017 | Mrowiec | ............... | H04B 7/2621 |
| 2017/0140637 A1* | 5/2017 | Thurlow | ............... | G08B 25/10 |
| 2017/0244615 A1* | 8/2017 | Takano | ............... | H04L 43/04 |
| 2017/0339575 A1* | 11/2017 | Kim | ............... | G01S 5/0054 |
| 2018/0054261 A1* | 2/2018 | Ding | ............... | H04W 12/06 |
| 2019/0028904 A1* | 1/2019 | Carpenter | ............... | G08G 5/0091 |
| 2019/0253389 A1* | 8/2019 | Verma | ............... | H04L 63/0236 |
| 2020/0100307 A1* | 3/2020 | Sridhara | ............... | H04W 76/15 |
| 2021/0019738 A1* | 1/2021 | Koppelman | ............... | G06Q 20/3224 |

* cited by examiner

|  | Houston, Texas | Miami, Florida |
|---|---|---|
| CapeTown, South Africa | 1.00 | 1.00 |
| Chennai, India | 1.00 | 1.00 |
| Kiev, Ukraine | 1.00 | 1.00 |
| Sao Paolo, Brazil | 1.00 | 1.00 |
| Singapore | 1.00 | 1.00 |
| Sydney, Australia | 1.00 | 1.00 |

(Rows: Attacker Location; Columns: Legitimate Call from Lab to Location)

FIG. 13 directions

DETECTING SS7 REDIRECTION ATTACKS WITH AUDIO-BASED DISTANCE BOUNDING

CROSS-REFERENCE TO RELATED APPLICATIONS

This application claims priority to, and the benefit of, U.S. Provisional Patent Application 62/647,863, entitled "DETECTING SS7 REDIRECTION ATTACKS WITH AUDIO-BASED DISTANCE BOUNDING" and filed on Mar. 26, 2018, which is incorporated by reference as if set forth herein in its entirety.

GOVERNMENT FUNDING

This invention was made with government support under grant numbers CNS1617474 and 1464088 awarded by the National Science Foundation. The government has certain rights in the invention.

BACKGROUND

Telephony systems represent the most ubiquitous and trusted communications infrastructure in the world. In both the developed and developing worlds, these networks offer reliable audio connections that allow their subscribers to chat with distant family members, perform important business transactions and even exchange highly sensitive information. Many sectors of the global economy, especially finance and infrastructure, rely on telephony systems as a critical fallback to ensure that high value transactions or significant changes to operation indeed originate from an authorized party.

The content of calls over telephone networks has been viewed as secure from most adversaries solely due to limited access to core networks. Only a small number of providers and governments have historically been able to manipulate the underlying Signaling System 7 (SS7) network. As such, SS7 was designed on a foundation of implicit trust—that is, anyone with access is authorized to make any request. This assumption is convenient, especially in a mobile context, where providers other than a users' home network may legitimately need to quickly redirect traffic to a roaming client. Such features could also be used to maliciously redirect traffic intended for a specific user, to ensure that its delivery path included a system controlled by an adversarial party interested in intercepting such traffic. Such SS7 redirection attacks were long assumed to be rare; however, deregulation in the 1990s and the increased diversity of access technologies to these networks have eliminated this assumption. The impact of these changes has been obvious. As recent media coverage demonstrates, SS7 redirection attacks have become increasingly common and are rumored to be a favorite means of eavesdropping by intelligence agencies.

While many are calling for SS7 to be "made secure", it is unlikely that this global infrastructure will be fundamentally redesigned and redeployed in the foreseeable future. As such, the most practical solution in the short and medium terms is the development of tools that allow end users to be made aware of when their calls are likely experiencing malicious redirection.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 13 is a table illustrating the results of the classifier when additional experiments were carried out when the audio loopback device was in Houston and Miami. This involved redirecting phone calls to new locations. The classifier was able to correctly classify all of the attacks.

DETAILED DESCRIPTION

Disclosed are various embodiments for detecting SS7 redirection attacks at call endpoints. These embodiments make use of the insight that SS7 redirection attacks increase the distance that call audio travels. As a result, these attacks also increase audio latency. The various embodiments of the present disclosure detect SS7 redirection attacks by expanding on techniques developed for line of sight distance bounding from the wireless community and use the audio channel between two endpoints to transmit challenge/response messages to securely estimate the round trip time (RTT) over a multihop network. Because of the use of the audio channel between the two endpoints, the present embodiments of the disclosure are termed "SONAR" or "SONAR protocol" herein, in honor of traditional sonar systems that use audio waves to map locations that are inaccessible or opaque to the eye (e.g., underwater). Like traditional sonar systems, SONAR relies on short bursts of audio to map connections between call endpoints in order to detect SS7 redirection attacks.

Some embodiments of the present disclosure implement a distance bounding-inspired protocol that is referred to herein as Rapid Audio Exchange (RAE). This protocol relies on a series of audio tones to implement a challenge-response protocol. Unlike traditional wireless distance bounding protocols, RAE is designed to operate in a multihop adversarial telephony network in which the endpoints are honest. This allows for various embodiments of the present disclosure to detect SS7 redirection attacks in an end-to-end fashion.

Various embodiments of the present disclosure demonstrate a 70.9% true positive rate (0.3% FP) for calls with varying attacker proximity (300-7100 miles), and a 97.0% true positive rate (0.3% FP) for all US calls redirected outside of North/Central America. Similar true positive rates are expected for local calls redirected outside of their local region (e.g., European calls redirected outside of Europe, Australian calls redirected outside of Australia, etc.).

Figure 1:
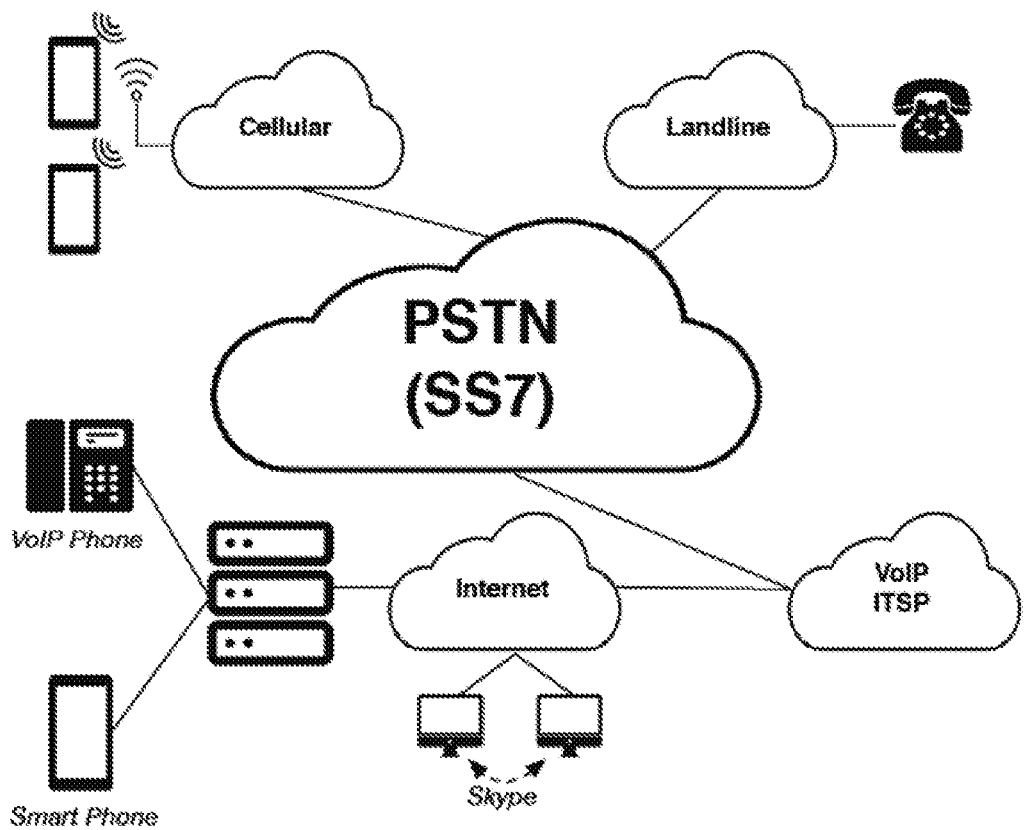
FIG. 1 is a diagram providing an illustration of the use of SS7 to connect individual telephone networks to form a global PSTN.

For context, the Public Switched Telephone Network (PSTN), is a diverse system connecting a variety of technologies including traditional landline, cellular, and VoIP. Each of these technologies define their own protocols to connect end devices (i.e., phones) as well as protocols for delivering calls, text messages, data, and other value added services. These interconnections are shown in FIG. 1.

While access protocols vary substantially at the network edge, call signaling, mobility management, and many other network features are provided by a protocol suite used by most networks known as Signaling System Number 7 (SS7). SS7 forms an all-digital communications network that is used for communications between telephone switches, important databases, and other core network entities. SS7 is used to set up and tear down phone calls and manage the location of mobile phones facilitate delivery of calls, messages, data, and roaming. Note that SS7 does not carry call content—only signaling information. SS7 is not only important for the many core network features that it facilitates; it is also important because it acts as a "lingua franca" between carriers, who may support different access technologies (e.g., landline and cellular).

Unfortunately, SS7 has a number of critical security vulnerabilities. The primary design flaw is that SS7 has no mechanisms for authenticating messages or determining whether a particular network endpoint should be authorized to send that message. As a result, any participant in the SS7 core network can claim to send messages on the behalf of another network entity and can claim to be authoritative for a given subscriber. A very simple consequence of this is that any SS7 network node can send a query to locate any mobile subscriber—trivially enabling powerful, high-resolution tracking of a user. In addition to global user tracking and call-flow modification, SS7 also provides facilities to completely deny service to the endpoint. In total, these vulnerabilities allow any SS7 core entity to track and control the flow of calls and text messages of any subscriber worldwide.

Some carriers now attempt to block some clearly malicious attack messages at the network edge using GFW firewalls, but many still do no filtering at all. For example, carriers in the United States do not block attack messages and provide no protection against SS7 redirection attacks. The problem is not easy to solve: many "attack" messages are simply abuses of necessary functionality. While ingress filtering of sensitive SS7 messages (like those that redirect calls) is an important first step, the design of the phone network still requires a substantial amount of faith in call routing and provides zero guarantees.

The openness of the SS7 network, combined with limited controls for authentication and authorization, means that several legitimate network functions can be abused to redirect calls. These attacks are stealthy, and while it is difficult to know how often they occur, there is evidence that these attacks are increasingly common.

The idea behind these redirection attacks is to cause a call to or from the victim to be sent to the attacker instead. The attacker can then forward the call to another destination or simply answer the call. If the attacker answers the call, the attacker can also place a call to the other legitimate call party and patch the audio between the two calls, allowing interception and eavesdropping of the apparently legitimate call. There are several network functions that facilitate this.

The first mechanism is the simplest: spoofing a call forwarding request. In this attack, the attacker spoofs a call forwarding registration message from the victim to the victim's home network. This message forwards the call from the victim to an attacker controlled number. If the attacker wishes to forward the call to the victim (to completely intercept and eavesdrop or tamper with the call) once the call is delivered to the attacker, the attacker spoofs a new message to the victim's network to disable call forwarding, and immediately after places a call directly to the victim (possibly spoofing caller ID).

The second mechanism designates an attacker endpoint as authoritative for all calls for a mobile phone, and it allows interception of incoming calls to any victim on a mobile network. Specifically, this is accomplished by sending a message to the victim's network that designates the attacker's SS7 endpoint as the responsible core network switch (i.e., the MSC) for the victim. Because the MSC is responsible for routing incoming calls to the victim, the attacking MSC can redirect the call to an attacker-controlled number.

The third mechanism abuses an SS7 feature called CAMEL, and it allows interception of a mobile subscriber's incoming and outgoing calls. CAMEL allows home networks to provide services while a phone is roaming. One feature is to intercept dialed numbers and modify them. To exploit this feature, the attacker registers itself as the victim's CAMEL server, then when calls are placed the attacker modifies the number dialed to one under the attacker's control. The attacker can then answer and forward the call audio in a manner similar to the other attacks.

The growth of VoIP has led to a notion of "convergence" of the Internet and the PSTN—that is, that eventually the phone network and the Internet will become one single network. In many cases, voice communications over the Internet have already replaced PSTN-based communications. This includes the use of peer-to-peer voice clients like Signal as well as the use of VoIP to connect to Internet Telephony Service Providers (ITSPs) who provide calling service from the subscriber to the global PSTN. These ITSPs may be entities like Vonage® or MagicJack®, cable companies, or wholesale service providers. While peer-to-peer VoIP communications are transmitted exclusively through the Internet, calls that transit ITSPs are likely to also be facilitated by the larger PSTN—meaning that VoIP calls are not necessarily protected from attacks against SS7. VoIP infrastructures are also vulnerable to the entire arsenal of Internet-based attacks, including attacks on interdomain routing. However, convergence does not just mean that some phone calls transit the Internet; it also means that much of the non-VoIP core telephony infrastructure has also replaced telephone-network specific technologies (e.g., digital trunks (T1), ISDN, and ATM networks) with IP-based networks. This vastly lowers the barriers for core network attack because the core network can be attacked using open source software like OpenSS7 running on Internet-connected commodity hardware.

Call audio delay is strongly correlated to the distance it travels between source and destination. An SS7 redirection attack increases the distance traveled by the call audio and can therefore be detected by measuring the RTT of the audio and comparing it against an expected range for a known distance.

Latency measurements in telephony systems differ from those in traditional IP networks. Specifically, latency is measured in terms of "mouth to ear delay," which represents the difference between the time that a caller begins speaking and the receiver hears the audio. The ITU G.114 standard provides guidelines via their "E-Model" transmission rating algorithms to delineate mouth to ear delay on perceived call quality. As shown in Table I, one-way mouth to ear delay of less than approximately 400 ms results in satisfactory call audio quality for the majority of phone users. This is in stark contrast to traditional IP-based networks, where latency of greater than 100 ms is widely viewed as negatively impacting a connection.

Figure 2:
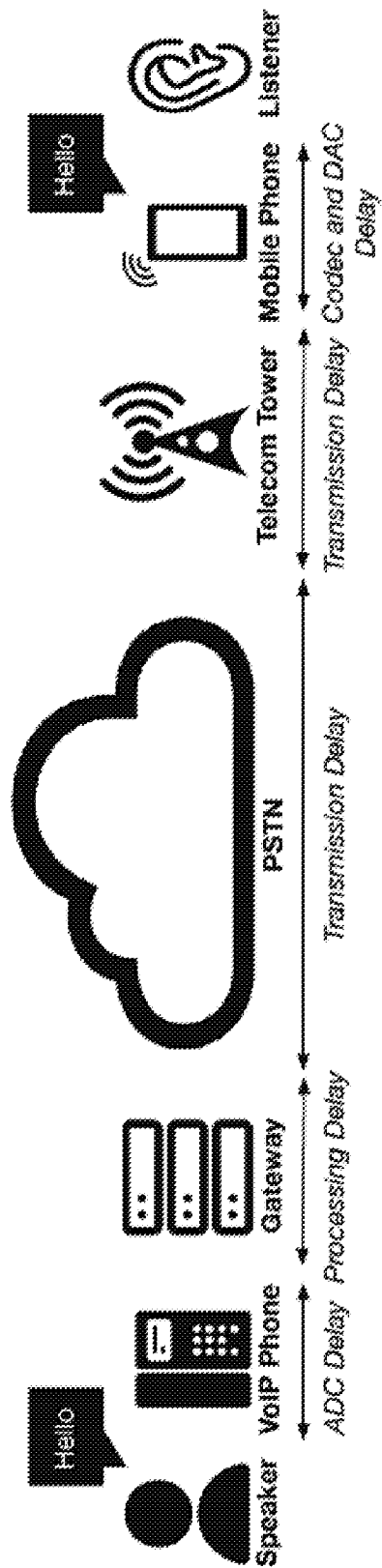
FIG. 2 is a drawing illustrating the many factors besides transmission time through a network that cause mouth-to-ear delay for audio in a telephone call.

FIG. 2 provides some intuition as to where such additional latency is added for telephony. Computational steps, including analog to digital conversion at the handset, network transcoding (i.e., transformation between audio codecs within the network), echo cancellation, and compression all delay audio delivery. These delays are on top of the traditional transmission delays in both the wired and wireless portions of telephony networks. It is also worth noting that the time introduced by the previous example is doubled when measuring RTT. Accordingly, it is not outside the normal range for audio transmitted by a sender, repeated by a receiver and returned to the sender to be judged as having good quality even with an RTT of nearly 800 ms.

Long mouth to ear delays are easily demonstrated with equipment available to the typical consumer. One can place a call between any two devices on telecommunication networks that are within reach of one another. When one speaks into one device and listen for it on the other (which should be muted to avoid feedback), a noticeable delay between when the noise is made and when it is played by the other device can be heard even though the devices are located near each other (e.g., in the same room).

While it is intuitive that increasing distance correspondingly increases delay, implementing embodiments that make use of this delay to detect SS7 redirection attacks face significant challenges. For instance, telephony networks are largely opaque to outsiders. They do not offer the equivalent of IP network functions such as traceroute that would allow researchers to characterize a call path or ping to measure RTT. As mentioned above, they also perform significant computation (e.g., transcoding), adding significant additional latency. Routing between destinations may also vary due to changes in the networks and the varying path of the call audio. This changes on a call to call basis and causes inconsistencies in network time. Finally, networks may delay the delivery of audio based on internal priority, quality of service requirements and even segmentation into frames for the air interface. As such, it is necessary for an implementation to create its own mechanisms to characterize normal network latency (using the ITU E-model as an independent confirmation of reasonable results), while accepting a higher degree of uncertainty than is traditionally experienced in Internet measurement studies.

We are concerned with an adversary who seeks to redirect a phone call. By "redirect," "change the routed path of the call" is specifically meant. The technical means by which this can be done are extensive, and SONAR is agnostic to the means used to redirect the call to them. We focus on SS7 redirection attacks in this paper, but other redirection attacks (including, but not limited to, BGP rerouting) can also be addressed.

The adversary has a number of capabilities that can frustrate defenders. The adversary can redirect a call to an arbitrary location under their control. The adversary can also arbitrarily modify call audio. This includes producing new sounds (including speech), dropping sounds, or adding noise. Naturally, this includes dropping, modifying, or fabricating SONAR messages sent through the voice channel. We assume the adversary can redirect both incoming and outgoing calls of a target. The adversary also can know the locations of victims with high accuracy (SS7 tracking attacks make this especially practical). As a consequence, one must assume the adversary also knows what latencies are expected for the redirected call. While an adversary can have access to the SONAR system, one can assume that the adversary does not control either call endpoint. This is actually a trivial assumption because if the adversary controlled the other endpoint, no redirection attack would be necessary. Accordingly, endpoints can trust each other to faithfully participate in the system.

SONAR provides a system and protocol to securely measure audio latency in the face of the above adversary. SONAR will provide both call endpoints with an accurate measurement of RTT and a decision as to whether that RTT is consistent with the distance of the call. To accomplish this, SONAR includes a cryptographic challenge/response protocol for establishing this distance. While the expected distance will vary from call to call, it will be shared with both call parties before the latency measurement begins. A number of attacks exist against challenge/response distance bounding systems, including the adversary guessing responses, replaying previously used challenges, and using more capable hardware. SONAR is designed to protect against all of these attacks, and this is further discussed in the present disclosure.

SONAR is designed to detect SS7 call redirection attacks. As a result, phone network attacks that do not significantly affect audio delay cannot be detected by SONAR, and must be defended against using other methods. Attacks that do not affect audio delay include denial of service attacks, attacks on SMS, and compromised end devices. Of course, if an adversary is located reasonably close to the victim, the associated redirection may not be detectable. The practical limits of the various embodiments of the present disclosure are discussed later in the present disclosure.

There are also a number of methods of phone call or other communications interception that do not rely on redirection attacks. This includes the legitimate or illegitimate uses of lawful intercept interfaces—technologies that facilitate "wiretaps" by law enforcement. This also includes attacks on cellular phone networks, including so called IMSI-catchers or Stingrays, as well as actual compromised core network devices. All of these are explicitly more difficult to achieve than SS7 attacks, and some require physical access. While there has previously been no effective countermeasure to protect against SS7 attacks, many of these other attacks have countermeasures that would be complementary to SONAR, including work to assure accountability in lawful intercept devices and to detect eavesdropping or tampering.

Next, the operation of the SONAR protocol is described. First, the differences between the SONAR protocol and previous research is provided. Then, SONAR protocol itself is described. Next, how SONAR provides secure measurement of round-trip-times (RTT) is provided, followed by a description of how data can be transmitted through the audio of the phone call. Finally, a description of how to establish end-to-end shared secrets for use in the SONAR protocol is provided.

Figure 4A:
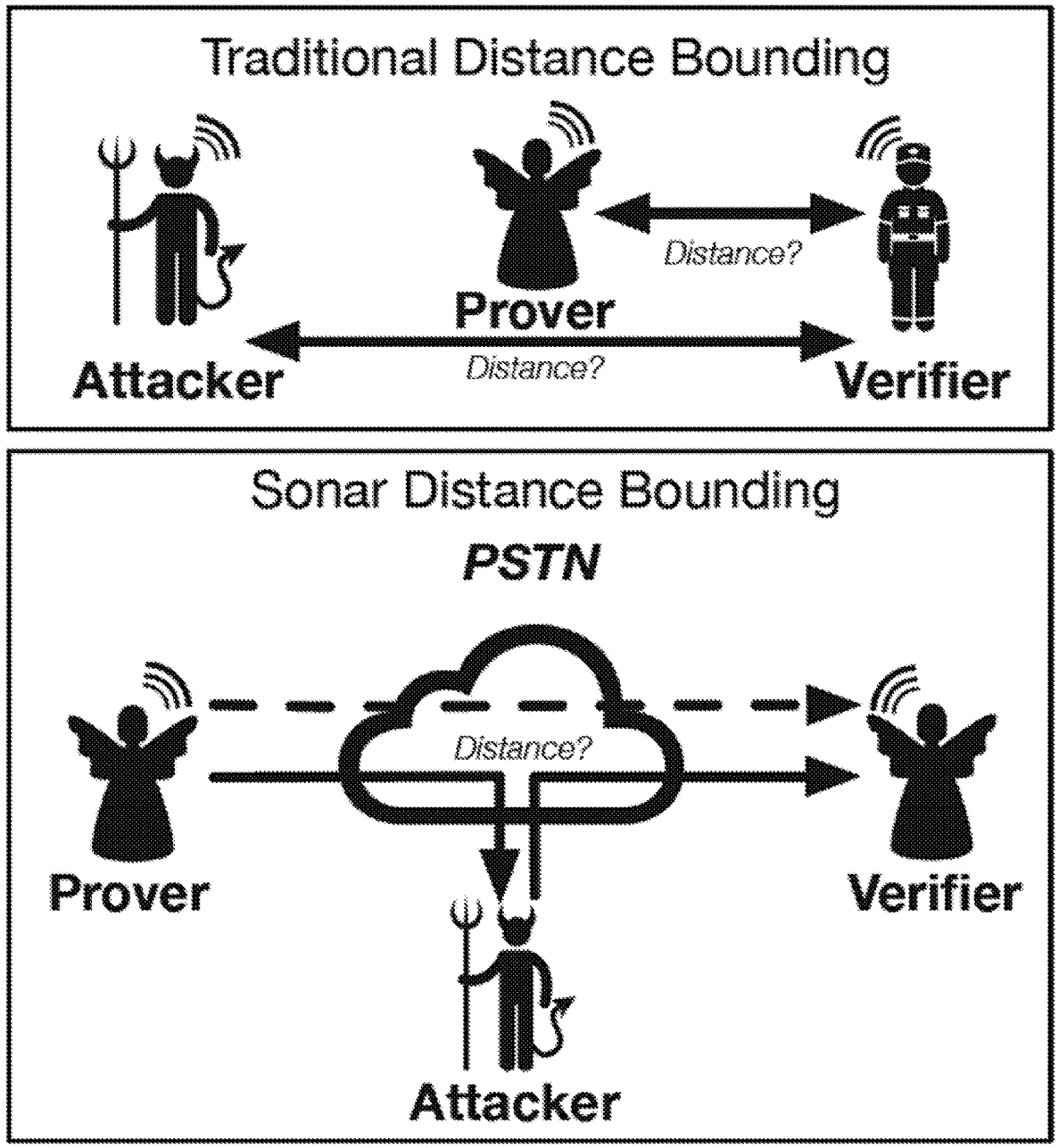
FIG. 4A illustrates the use of distance bounding in various embodiments of the present disclosure compared to traditional implementations of distance bounding. As illustrated, in traditional implementations of distance bounding, the verifier does not trust the prover, while in the various embodiments of the present disclosure both communicating parties are trusted.

Distance bounding is a well studied technique designed to limit attack distance. It is most prominently featured in situations where distance between two parties can be known a priori. Two frequent examples are line-of-sight wireless communications and smartcard-based payment terminals. SONAR bounds distances in a unique context against a fundamentally different adversary than "traditional" distance bounding techniques. These differences are illustrated in FIG. 4A. In traditional distance bounding, the distances to be measured are typically limited by physical constraints. For example, the communications delay between a smart card and reader or the distance to propagate a short-range wireless transmission. As a result, distance bounding typically provides centimeter level resolution of distance. By contrast, SONAR needs to detect attacks given a known but highly variable physical distance. Most distance bounding also assumes a direct connection in legitimate cases. In SONAR, one must bound distance, assuming a network with unknown and unpredictable routing. This behavior is also present in SS7 network in FIG. 4A, which connects the prover and verifier in the SONAR system. The distance the call travels during routing may also vary significantly; as a result, calls that vary in physical distance by hundreds of miles may experience comparable audio latency. Also, as shown in FIG. 4A, in traditional distance bounding the prover may actually be the adversary known as "mafia fraud." In SONAR, the adversary is a compromised network and both parties are trusted. Finally, in SONAR, both parties need confidence that the call has not been intercepted, while in traditional distance bounding, only the verifier needs to know the distance.

Figure 3:
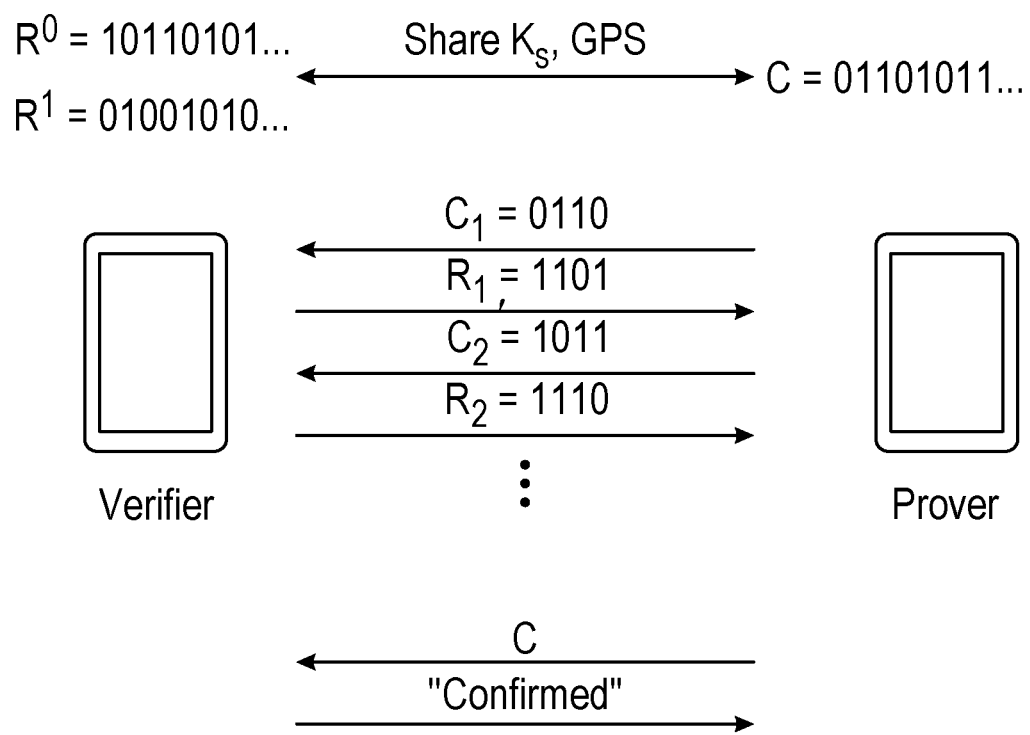
FIG. 3 is a sequence diagram illustrating the use of a cryptographic challenge response to measure call round-trip-time.

The SONAR protocol proceeds in three phases, which are termed "initialization," "rapid audio exchange (RAE)," and "reconciliation." This protocol is visualized in FIG. 3.

We follow the common practice in distance bounding of referring to the participants as prover P and verifier V. In traditional distance bounding, the onus is on the prover to participate honestly to prove their distance to the verifier. Note that in SONAR the prover and verifier work collaboratively to accurately measure the call RTT. It is important to have a convention of which party is prover or verifier to prevent an ambiguity that could be exploited by the adversary, so the role of "prover" is arbitrarily assigned to the caller.

The initialization phase exchanges information needed for other parts of the protocol, especially for the RAE. The RAE is a challenge response step that exchanges data between the prover and verifier. Finally, in reconciliation both parties confirm that they have measured a reasonable RTT and commence to complete the call.

In the initialization phase, P and V first establish a session key, $k_s$. This key can be established in a multitude of ways. Second, V generates a random challenge bitstream, C, and both V and P generate two pseudorandom bitstreams, $R^0$ and $R^1$, based on the session key. Both P and V have to ensure that the generated keys and data are not used across multiple sessions. Finally, P and V exchange GPS location information. This allows both parties to verify that the measured RTT is consistent with the call distance, which is depicted in FIG. 4A.

Next, in the RAE phase, P and V securely exchange data in order to measure the round trip times (RTTs). In Hancke-Kuhn distance bounding, V sends P a series of individual bits from C sequentially. For each challenge bit, P responds as fast as possible with the next bit from $R^0$ if the bit is 0, and $R^1$ otherwise. V accepts each response if it is correct and arrives within some specified time. Because each of P's responses depend on the challenge sent by V, P cannot send responses earlier to create an impression of a lower RTT. This design also allows V to validate responses as they are received. This is termed as "rapid bit exchange."

In contrast to the Hanke-Kuhn protocol, during execution of the SONAR protocol, V sends a batch of l challenge bits as audio from C instead of a single bit. P responds as soon as possible with l response bits, where each bit is drawn from $R^0$ or $R^1$ corresponding to the respective challenge bit. Because many challenge bits are sent at once, this exchange is termed as "rapid audio exchange" (RAE) in recognition of the fact that bursts of information in audio are sent—not single bits.

Batching bits has two advantages. First, increasing the number of bits transmitted and received vastly reduces the adversary's probability of guessing the challenge or response from ½ to $2^{-l}$ for each exchange. Second, total protocol execution time is primarily caused by relatively long RTT, so by batching bits one can maintain high security while limiting execution time.

After the RAE phase completes, the reconciliation phase establishes whether the data was exchanged without being tampered and decides whether the RTT is consistent with the distance. All messages in this phase are sent over a secure channel. V and P first evaluate their received responses to determine that they were correct and unmodified by the adversary. V confirms that the sequence of response bits are correct. If correct, V then sends the transmitted challenge bits C to P so that they can verify that they received the correct challenge and not challenges fabricated by an adversary. V also sends the measured RTT to P, along with the verifier's decision as to whether the RTT is consistent with their measurement. After V confirms C, they respond with an acknowledgment that C was correct and they confirm a desire to continue with the call. If at any point in the reconciliation a check fails, the party with the failing check sends a message to the other and disconnects the call.

Because all RAE messages are pseudorandomly generated based on the output of a key unknown to the adversary, the adversary can successfully randomly guess challenge or response bits with probability $2^{-n}$, where n is the total number of challenge or response bits. This prevents an adversary from preemptively sending bits to provide a smaller RTT than would otherwise be measured. Similarly, because session keys are guaranteed to be unique for every call, replay attacks are not possible. An adversary's ability to create an advantage with faster hardware can be limited by ensuring that the prover and verifier processing time is much less than the RTT. Finally, because an attacker cannot predict a challenge or response, and because the adversary must be located on the redirected call, an adversary cannot cause a verifier to receive a response to a challenge faster than the RTT between the prover and verifier.

SONAR can transmit audio using any one of several techniques. The simplest technique involves sending dual-tone multi-frequency (DTMF) tones (commonly known as "touch tones" used to dial digits) to represent 1 of 16 possible values. These tones have the advantage that they are simple to implement and work with all phone systems, but have the disadvantage that only a few tones per second (tens of bits per second) can be sent. Voice modem technologies (as used for dial-up internet access) could also be used, though standard voice modems cannot transmit data over cellular or VoIP calls due to voice-specific data compression techniques. SONAR could instead leverage new techniques for secure data transmission over phone calls to transmit information at roughly 500 bits per second. Note that a low probability of bit error is assumed in this protocol. This can be assured by using redundant data coding along with cryptographic integrity checks of messages after transmission. Finally, for non-RAE portions of the protocol, an out of band communications channel (such as a secure data connection) can also be used.

The security of rapid bit exchange relies on a shared secret being known to the distance bounding participants but not the adversary. We assume that the protocol participants have already established a long-term symmetric secret, or have a means of establishing a secret in an authenticated way in the presence of an adversary. Recent work in call authentication has provided methods that SONAR can use to establish these secrets. Both techniques rely on public keys assigned to phone users to conduct secure communications. Both techniques also derive a shared secret that can be used by SONAR.

Figure 4B:
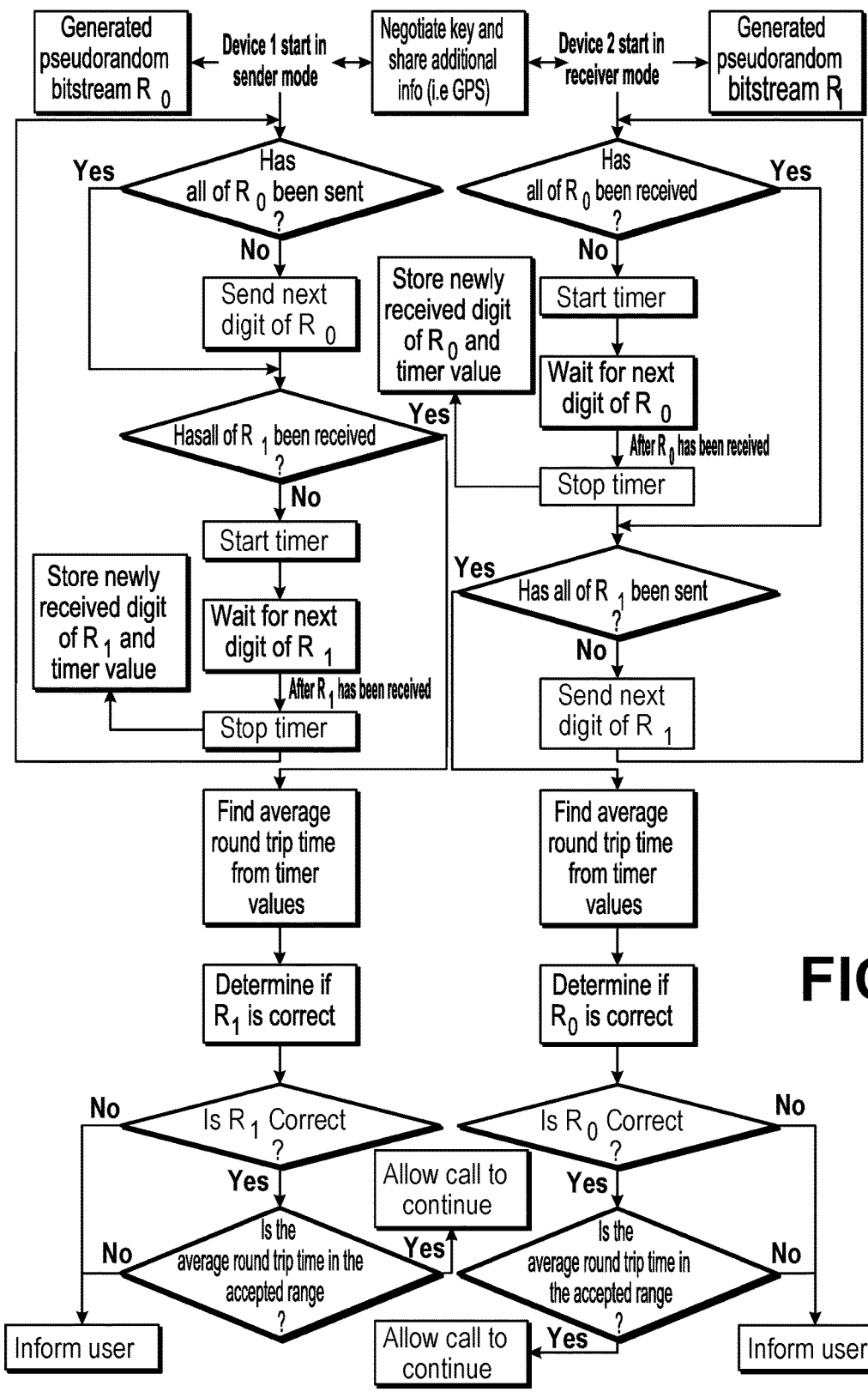
FIG. 4B is a flow chart depicting the operation of various embodiments of the present disclosure.

Referring next to FIG. 4B, shown is a flowchart that provides one example of the operation of a portion of an implementation of SONAR according to various embodiments. It is understood that the flowchart of FIG. 4B provides merely an example of the many different types of functional arrangements that may be employed to implement the operation of SONAR as described herein. As an alternative, the flowchart of FIG. 4B may be viewed as depicting an example of elements of a method implemented in a computing device according to one or more embodiments.

To begin, a first device starts in "Sender Mode" and a second device starts in "Receiver Mode." The two devices may be smartphones, cell phones, tablets, laptops, or similar computing devices with microphones that can provide for telephony (e.g., GSM phone calls, VoIP phone calls, etc.). The first device generates a pseudorandom bitstream $R_0$, as previously described, and the second device generates a pseudorandom bitstream $R_1$, as previously described. The first and second device also negotiate a cryptographic key and share additional information (e.g., current location based on GPS, GLONASS, or similar geolocation circuitry) necessary to implement the SONAR protocol.

Next, the first device begins sending bits from bitstream $R_0$ to the second device. After the first bit is sent from $R_0$, the first client device waits to receive a bit from the second device from bitstream $R_1$. Once the bit is received, the time it took to receive the bit from $R_1$, as well as the bit itself, is stored. The first device then sends another bit from $R_0$ to the second client device and the process is repeated until all of the bits in $R_0$ have been sent and all the bits from $R_1$ have been received. Similarly, the second client device waits to receive a bit from the first client device from $R_0$. As each bit is received, the time it took to receive the bit from $R_0$, and the bit itself, is stored. Likewise, once a bit is received from $R_0$, the second device then sends a bit from $R_0$. Once the bit from $R_1$ is sent, the second device then waits to receive another bit from $R_0$. The process is repeated until all bits from $R_0$ have been received and all bits from $R_1$ have been sent.

Once all of the bits from $R_0$ and $R_1$ have been sent, the first device and the second device determine the average round trip times (RTTs) from the timer values associated with the received bits. For example, the first device may determine the average RTT between the two devices by using the elapsed time between when the timer was started after a bit from $R_0$ was sent and the timer was subsequently stopped when a corresponding bit from $R_1$ was received. The second device may use a similar approach. Each device then determines if the received bitstreams are correct (e.g., are the bits from $R_1$ received by the first device correct and are the bits from $R_0$ received by the second device correct), and if the RTTs are within an acceptable range, as previously described. If both conditions are satisfied (e.g., if the correct bits from each bitstream are correct and the RTTs are acceptable), then the call is allowed to continue. If a device determines that either one of the conditions is not satisfied (e.g., an incorrect bit was received or the average RTT is unacceptably long), then the user is informed (e.g., via a screen prompt, alert, audio tone, etc.) that the call is likely being intercepted through an SS7 redirection attack.

In some embodiments, the process may end at this point as the call continues. However, in other embodiments, the process may be periodically repeated in order to detect SS7 redirection attacks that may be performed at some later point during the call.

Having designed a protocol that uses RTT to verify the legitimacy of a call, a number of experiments were performed to verify its operation. First, RTTs need to be measured to verify call latency is directly correlated with the physical distance between the communicating parties. Then, it needs to be established if the audio in a rerouted call exhibits higher RTTs in comparison to a legitimate call. This can be accomplished by emulating an actual rerouting attack. Real SS7 attacks can also be executed in order to validate the accuracy of the emulation. The real attacks are discussed in a later section.

Figure 5:
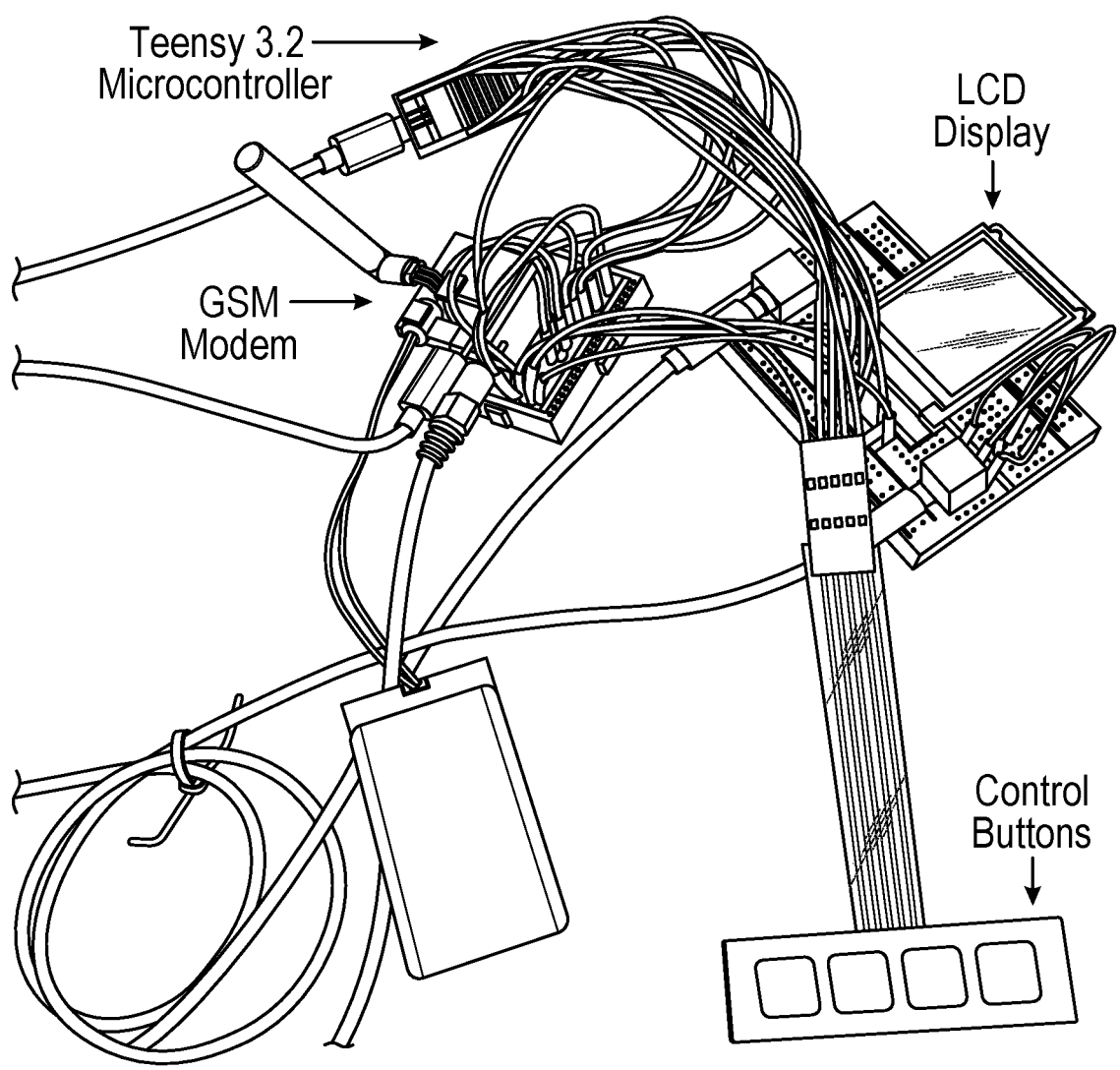
FIG. 5 depicts a number of components that make up a GSM calling device. At the very top of the image is the Teensy 3.2 microcontroller. Directly below that, easily distinguished by its antenna, is the Adafruit FONA GSM module. To the right of that is an LCD display used for call information. The control buttons at the bottom of the image are used to initiated and end calls as well as initiate playing DTMF tones.

We focus first on the problem of measuring the RTT and routing path for an arbitrary call. Since one cannot query or influence the route a call takes through the PSTN, a system is constructed that will allow one to select and know the call route in order to collect any meaningful measurement of RTT or distance. We do this for 3 different telecommunication setups: GSM-to-GSM, VoIP-to-VoIP, and VoIP-to-GSM. GSM-to-GSM. First, the RTT for calls on the telephone network need to be characterized in order to evaluate if any redirection system constructed has similar RTT to distance correlation. Measuring RTT for cellular devices is challenging, especially with modern smartphones that restrict access to call audio and network features. To overcome this barrier, hardware was designed that grants direct access to the call audio stream. The GSM network was chosen for the reason that GSM modems are easily accessible and well documented. Regardless of what cellular network is chosen to be incorporated into the experiments, the results will be analogous due to the system operating in the voice channel. Two GSM devices were built: one device places calls and transmits DTMF tones while the other that accepts the call and echoes back any received audio. As shown in FIG. 5, the devices are constructed from a Teensy 3.2 microcontroller and an Adafruit Fona GSM module.

To obtain precise measurements of the audio stream, a logic analyzer was attached to the audio output of the calling device. The calling device notifies the logic analyzer to start recording immediately after it sends the DTMF tone to the echoing device. We then measured the difference between the start of the recording to the beginning of the echoed DTMF tone to obtain the RTT.

While one cannot control the path a PSTN call takes through the network, one can exert some control over the path VoIP traffic takes over an IP network. Acquiring RTT data for VoIP-to-VoIP calls was conducted in a manner similar to the GSM-to-GSM calls. Two PCs running the VoIP software PJSUA were used, where one is the caller and the other is an audio loopback receiver. After the call is established, the caller starts recording the call while simultaneously playing an audio sequence into the stream. The RTT for the call audio is obtained by measuring the time between the echoed audio entering the audio stream and being recorded at the receiver. This is representative of the "worst case scenario" for time introduced by rerouting attacks.

Figure 6:
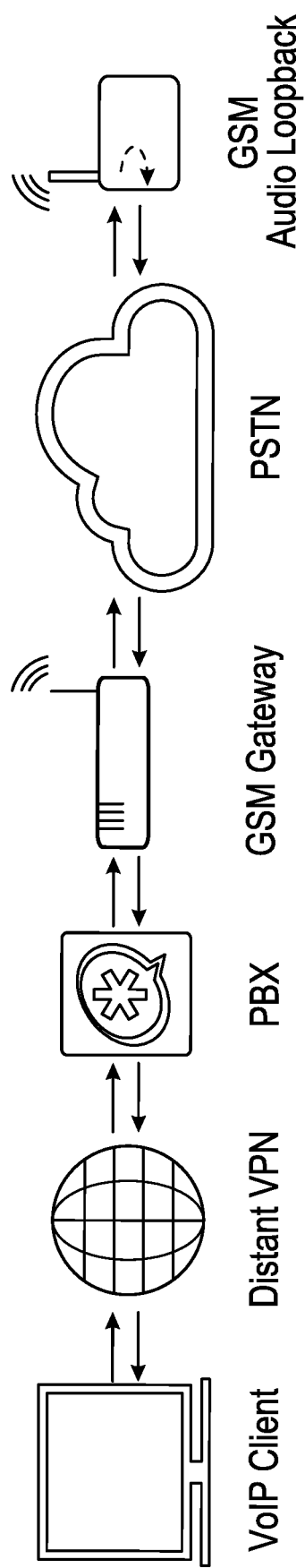
FIG. 6 is an illustration of the setup of a Voice-over-IP (VoIP) to GSM system. As illustrated, a VoIP client registers with a PBX server which routes the VoIP call to the GoIP. The call is then connected to the GSM network and sent to the echoing device.

Finally, because of the difficulty of executing actual SS7 rerouting attacks legally and ethically for a variety of locations, and because no emulator exists, SS7 redirection attacks were emulated. In order to emulate a redirection, a VPN can be used to force the IP network traffic for a VoIP call to traverse an additional hop in the network. After traversing the VPN, the call returns to a local Asterisk PBX, connected to a Hybertone GoIP-1 GSM gateway6, which places a cellular call to the GSM echoing device described above. This flow is shown in FIG. 6. If RTT and distance are truly correlated, this experiment will influence RTT by augmenting the normal VoIP traffic with an additional network hop, faithfully emulating an SS7 redirection attack.

Figure 7:
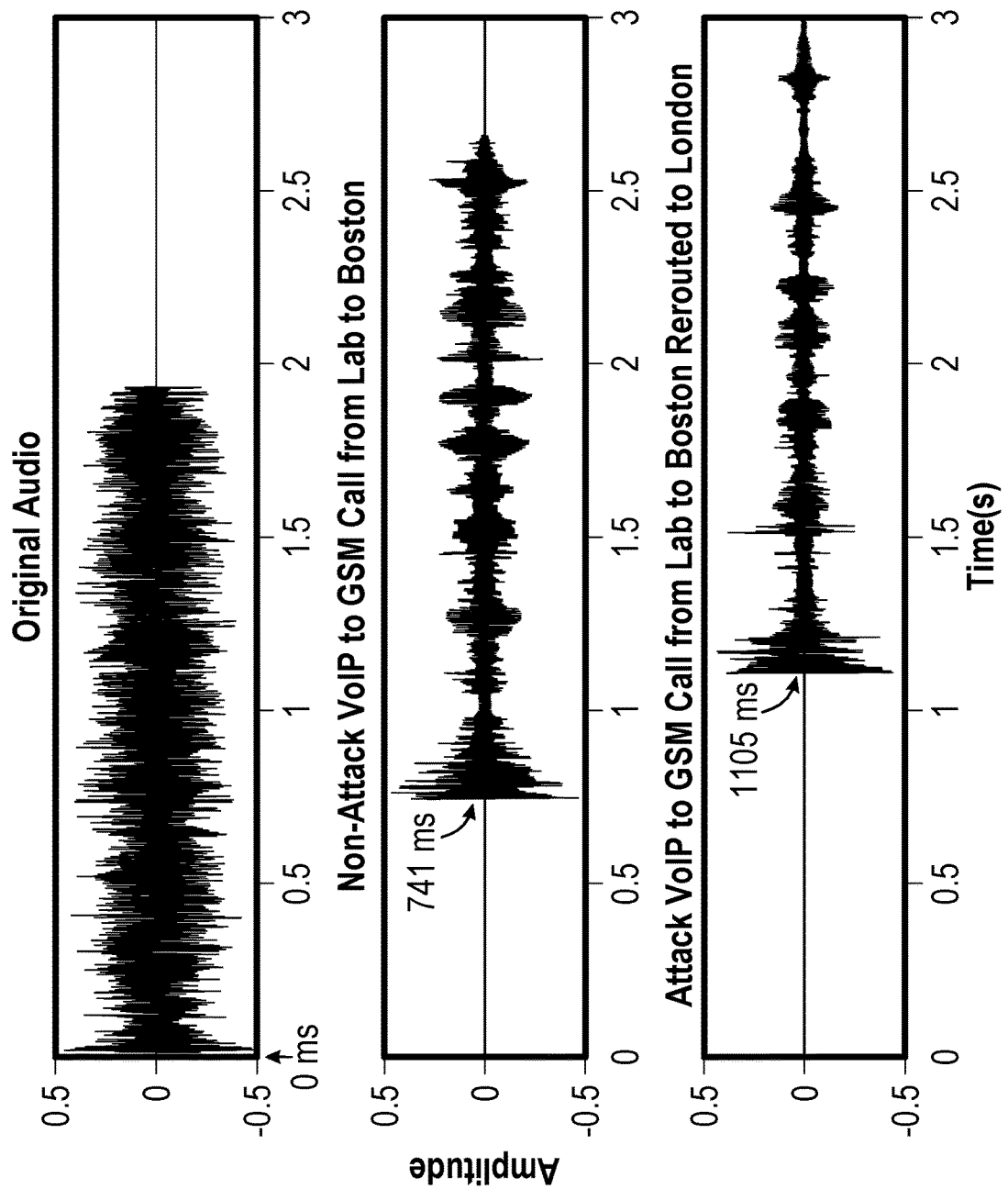
FIG. 7 is an illustration of the waveforms of different devices used to verify the principles of the disclosure. The top waveform is the time domain representation of the audio sample used to obtain RTT values for the VoIP to GSM experiments described in detail herein. Beneath that is a recording of call audio for a VoIP to GSM call from Applicant's lab to Boston. The audio sample at the top is played as soon as the call is connected and returns after 741 ms. The bottom waveform is a recording of call audio for a VoIP to GSM call from Applicant's lab to Boston where call audio is rerouted to London. It can be seen that the audio returns at 1105 ms, much later than the call without rerouting.

For this experiment, the VoIP client is identical to the VoIP-to-VoIP calls described above. In order for the client to place calls through the gateway, a private branch exchange (PBX) server is set up that allows the two to communicate. The calls initiated on the client end, are tunneled through the PBX server to the gateway where they are transferred onto the PSTN. These three devices, outlined in FIG. 7, are at a fixed location, giving the ability to control the call route. Once this infrastructure is in place, one can reroute and measure calls to arbitrary locations.

It may initially seem that VoIP-to-PSTN providers (e.g., Vonage and MagicJack) could provide similar functionality with less complexity. However these systems suffer from a similar problem to the PSTN: they are opaque and call routing is not visible. These systems must route a call to a switch that physically connects to the PSTN, adding additional unknown distance and routing to the call. By fixing the location of the PBX and gateway, the exact route the calls must take is both controlled and known. In essence, one is constructing their own VoIP-to-PSTN provider. As a result, more precise measurements for both distance and RTT can be made.

In order to collect data for a geographically diverse set of locations, the GSM echoing device (prover) was physically shipped or personally transported to multiple locations throughout the continental United States, including most major regions: Southeast (Atlanta, Ga.; Miami, Fla.), Northeast (Boston, Mass.; Stroudsburg, Pa.), West (Eugene, Oreg.; San Diego, Calif.; San Jose, Calif.), South (Houston, Tex.), and the Midwest (Chicago, Ill.). Since the device required a human volunteer to physically power on the device and ship it to its next location, the availability of willing volunteers and the quality of cellular phone service at the locations was a deciding factor in selecting these particular locations. Locations were also selected based on where the VPN provider maintained endpoints to allow performance of VoIP-to-VoIP experiments, allowing for verification that VPN latency corresponds to expected latency during a real SS7 attack.

At each location, two types of calls were executed: legitimate calls and rerouted calls. For legitimate calls, RTT was measured alongside great circle distance while performing VoIP-to-GSM and GSM-to-GSM calls. This allowed for both baselining the expected values and testing for false positives. Finally, an attack call was emulated by performing a VoIP-to-GSM call while rerouting the VoIP call through a VPN endpoint, forcing the traffic to traverse an additional route.

We chose four VPN endpoints within the United States, distributed at each corner of the country, to emulate an SS7 attack being executed within the US: Seattle, Wash.; San Diego, Calif.; Miami, Fla.; and Boston, Mass. These RTTs are expected to be substantially lower than calls routed internationally due to the shorter distance traversed. Accordingly, these calls should be more difficult to detect. To emulate SS7 attacks where the attacker is redirecting the call internationally, 11 international VPN endpoints were used across multiple regions: South America (Panama City, Panama), Western Europe (London, UK), Eastern Europe (Moscow, Russia), Middle East (Tel Aviv, Israel), and Asia Pacific (Tokyo, Japan). After training on these cities, VPNs in extra cities were used to validate the model. Those cities consist of Sydney, Singapore, Sao Paulo, Kiev, Chennai, and Cape Town.

Figure 8:
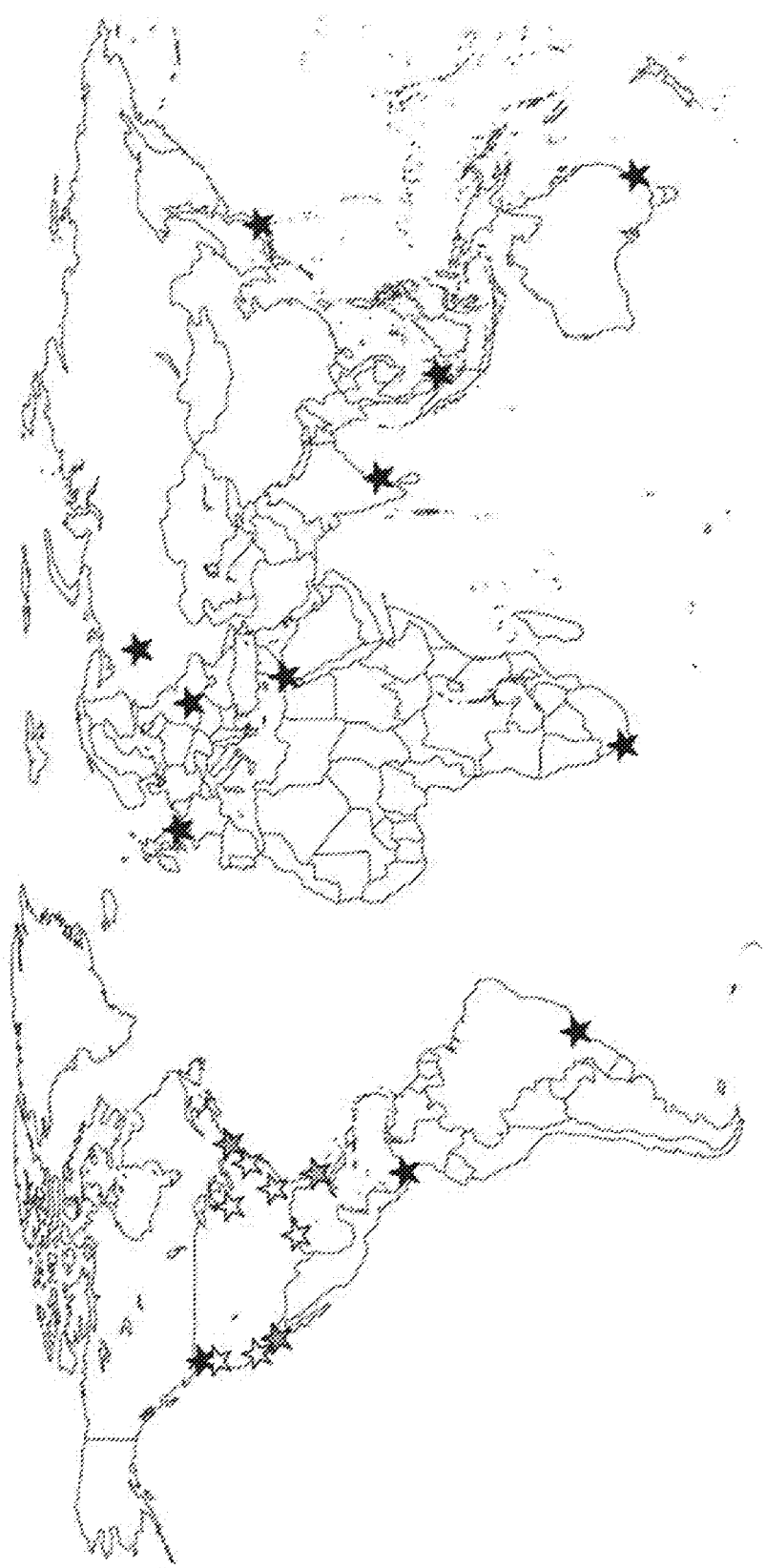
FIG. 8 is map showing the various test locations for Applicant's experiments. Black stars indicate locations where a VPN server was used for rerouting call data. White stars indicate locations where the echoing device traveled. Grey stars indication locations where the echoing device was sent and where a VPN server was used to reroute calls. No star is included for the location of Applicant's lab in order to avoid deanonymizing experimental data.

The audio loopback device was carried to 9 locations, shown in FIG. 8. Calls were also performed locally in a laboratory, which is omitted from the map so as to not deanonymize the laboratory staff. At each location, approximately 240 calls were executed and measured, corresponding to 4 hours of experiments per location. In total, the experiments took 44 hours to run over a period from May 2, 2017 through Aug. 25, 2017. Note that this period does not include early test measurements and device calibrations that began as far back as January 2017.

Now that how to collect data has been described, the design of an anomaly detection system that allows for characterizing the effectiveness of using RTT to detect calls is described. Building this detection system faces a number of challenges: First, a lack of an exhaustive dataset of call data for all locations means that the detection model needs the ability to interpolate estimates of reasonable RTT for locations not in the training data. Second, note that routing distance can vary significantly from great-circle geographic distance. While RTT intuitively increases with distance, due to variances in physical routing of the call there is a high variance in the actual RTT from call-to-call. This means that attempting to estimate the actual distance from an RTT is quite difficult, and it was found that even the most flexible regression models (which were not used) can misestimate distances by thousands of miles. As a result, two locations that are the same geographic distance can have very different audio latencies. The model must take this into account. Third, the test locations were carefully chosen to provide insight into how varying distances affect RTT, not the most likely or probable attack locations (which will of course vary from victim to victim). While it would be possible to train a binary classifier to distinguish between the collected attack data and the legitimate call data and get good accuracy, this test would be heavily biased by the choice of attack locations. Finally, to characterize the effect of attackers located close to a victim some of the redirection experiments move a call only a short distance. Because there are several close attacks for every legitimate call, some classifier models would be more likely to consider legitimate calls as false positives.

Because specific redirection attacks (e.g., Atlanta to Boston via London) were not attempted to be detected, but rather any redirection of the call, an anomaly detector was found to be the most appropriate model. For this, a classifier using the commonly used One-Class Support Vector Machine classifier (OCSVM) was developed. This classifier is similar to a standard support vector machine, except that rather than identifying a decision boundary between two classes it identifies a boundary that includes all training data but minimizes the area not including training data.

Like traditional SVM classifiers, OCSVM can also use a kernel method to learn non-linear boundaries (among other properties). A radial-basis function (RBF) is used as the kernel because it allows for learning a generalized organically shaped region with no assumptions about the underlying data distribution. Like most machine learning techniques, this technique requires the selection of hyperparameters that affect the model learned from data. We set these factors extremely conservatively to minimize the possibility of false positives on legitimate calls with extreme latency values relative to their location. OCSVM uses a hyperparameter v to effectively regularize the boundary learned. v can be interpreted as both a) the maximum percentage of "outliers" to be ignored in the training data and b) the maximum classification error of in-region data. Because all of the call data points are considered to be legitimate, v was set to equal 0:01. This conservatively limits false positives and expands the learned region, making the classifier more likely to accept legitimate calls outside the training data set. RBF kernels use a hyperparameter γ that can be interpreted as the effect that any individual data point has on the learned model. We set γ=0:05 so that every point has a significant and far reaching effect on the model. This also gives protection against misclassifying extreme legitimate values.

We note that this model has the crucial advantage that it assumes no prior underlying distribution of the data. This is critical because while RTT tends to increase with distance, the rate at which it does so can vary on technology used, network conditions, routing topologies, and variable effects like congestion. Note also that the model is currently only trained and evaluated on VoIP-GSM calls. This is because VoIP-to-GSM calls are the only types of calls, not including the actual SS7 attack calls that were made, for which both legitimate and redirected data was collected for a variety of locations. The data collected for real SS7 rerouting calls is not included in the model, which is further explained in a later section.

The results of the experiments are now presented. Further discussed is the analysis methodology and a demonstration of how call redirection can be accurately detected. These results are then used in a later section in determining the accuracy of the simulation with data from real SS7 rerouting attacks.

Figure 9:
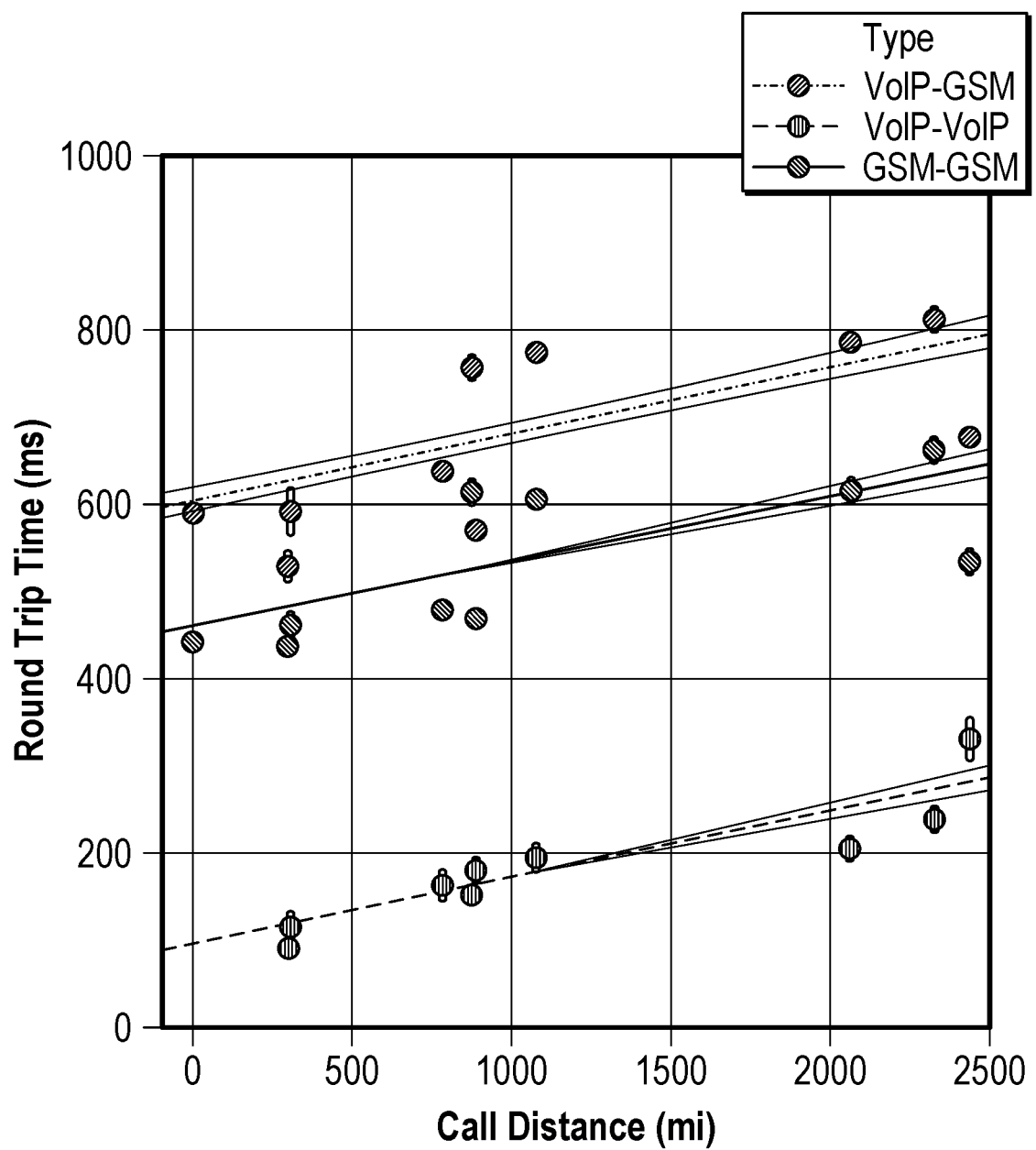
FIG. 9 is a graph showing measured RTT vs. distance for all calls to each location. Regardless of call technology, RTT is shown in FIG. 9 to be strongly correlated with call distance.

FIG. 9 displays the means (with error bars) of non-attack calls for each location broken down by technology (GSMGSM, VoIP-VoIP, and VoIP-GSM). The figure shows trend lines for each call type and shows visually the correlation between call distance and RTT. To begin, the hypothesis that RTT is correlated with great-circle distance is verified. The Spearman correlation ρ between distance and measured RTT for each of the three types of calls is calculated. Spearman correlations indicate monotonicity of the data being compared and assume no underlying distribution of the data. In the present case, higher ρ values (approaching 1) indicate a better fit of the points to the regression, meaning a higher likelihood that RTT and distance are correlated. For VoIP-to-GSM calls, ρ was calculated at 0.68; GSM-to-GSM at 0.75; and VoIP-to-VoIP at 0.78 (all of which fall in the accepted range for strong correlation). All three calculations had a ρ-value of <0:001, indicating that these results are also statistically significant. Therefore, this confirms the null hypothesis that these two variables are correlated.

Several trends are evident from this plot. First, different call types experience different levels of RTT. For example, VoIP-GSM calls experience approximately 150 ms more latency than GSM-GSM calls. Second, while there is strong correlation between distance and RTT, the relationship is not perfectly linear. For example, calls across a distance of 2400 miles sometimes saw a lower RTT than calls only 2100 miles away. This reflects the fact that RTT measures actual call distance through the network, which may diverge from the ideal great circle distance. Finally, all of the RTTs for GSM-GSM calls are consistent with "Users Very Satisfied" or "Users Satisfied" mouth-to-ear delay guidelines from the ITU E-Model. Because the E-Model is relied upon by carriers to plan and provision network services with a high quality of service, the measured values are highly likely to be consistent with the true RTT.

With the understanding that distance is correlated to RTT, an SS7 attack is emulated and the effects are measured. As previously discussed, conducting SS7 attacks legally and ethically is difficult. In addition to this, no emulator exists to allow one to test this part of the hypothesis on the telephony network. We therefore use the VoIP-to-VoIP measurements to baseline the expectations. As FIG. 9 shows, the VoIP-to-VoIP legitimate call RTTs increase similarly with distance to GSM-to-GSM calls. However, VoIP-to-VoIP calls have substantially lower RTT than any call placed over the cellular network. While this is expected given that the telephone network must manipulate call audio, it provides an additional key insight to the methodology: using a VPN to redirect calls will cause a smaller increase in RTT than one would expect from a redirected call in the phone network, making the emulated calls more difficult to detect than a real SS7 attack. This intuition is confirmed with real SS7 attacks.

Figure 10:
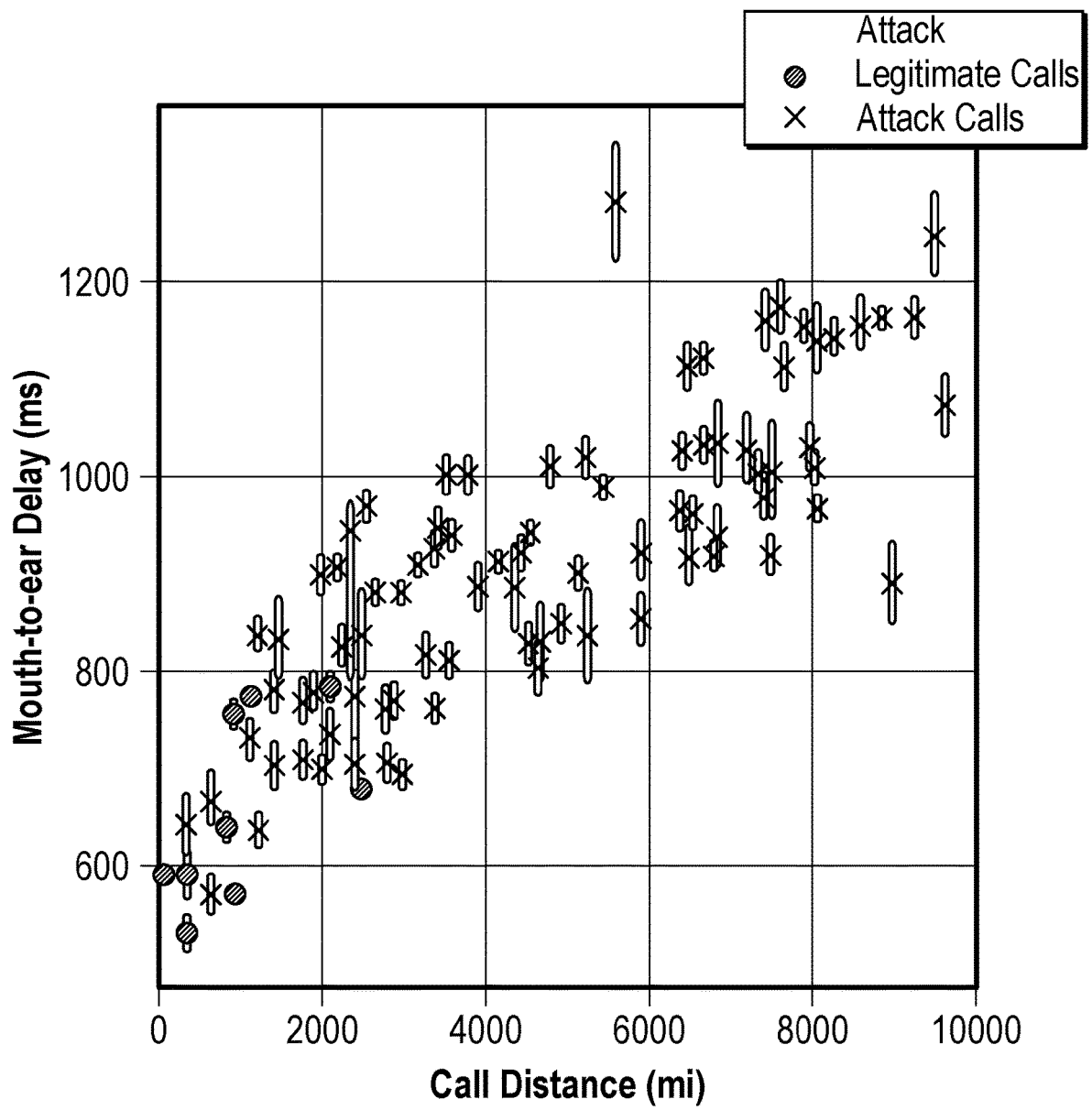
FIG. 10 is a graph showing measure RTT for VoIP calls to GSM calls. As illustrated, delay increases with the increase of distance.

The emulated SS7 attacks consisted of a VoIP-to-GSM call routed over a geographically-diverse set of VPN endpoints. The results are shown in FIG. 10, which shows the RTT vs. the great-circle distance of the call including the redirection. Again, one sees an increase in RTT as call distance increases. The Spearman ρ value was 0.79 (ρ<0:001), indicating a strong correlation between RTT and call distance. This confirms that the hypothesis still holds with the redirected calls.

While this confirms that RTT and distance are correlated and that redirection of VoIP calls results in an expected increase in RTT, the detector for redirected calls is also evaluated.

Figure 11:
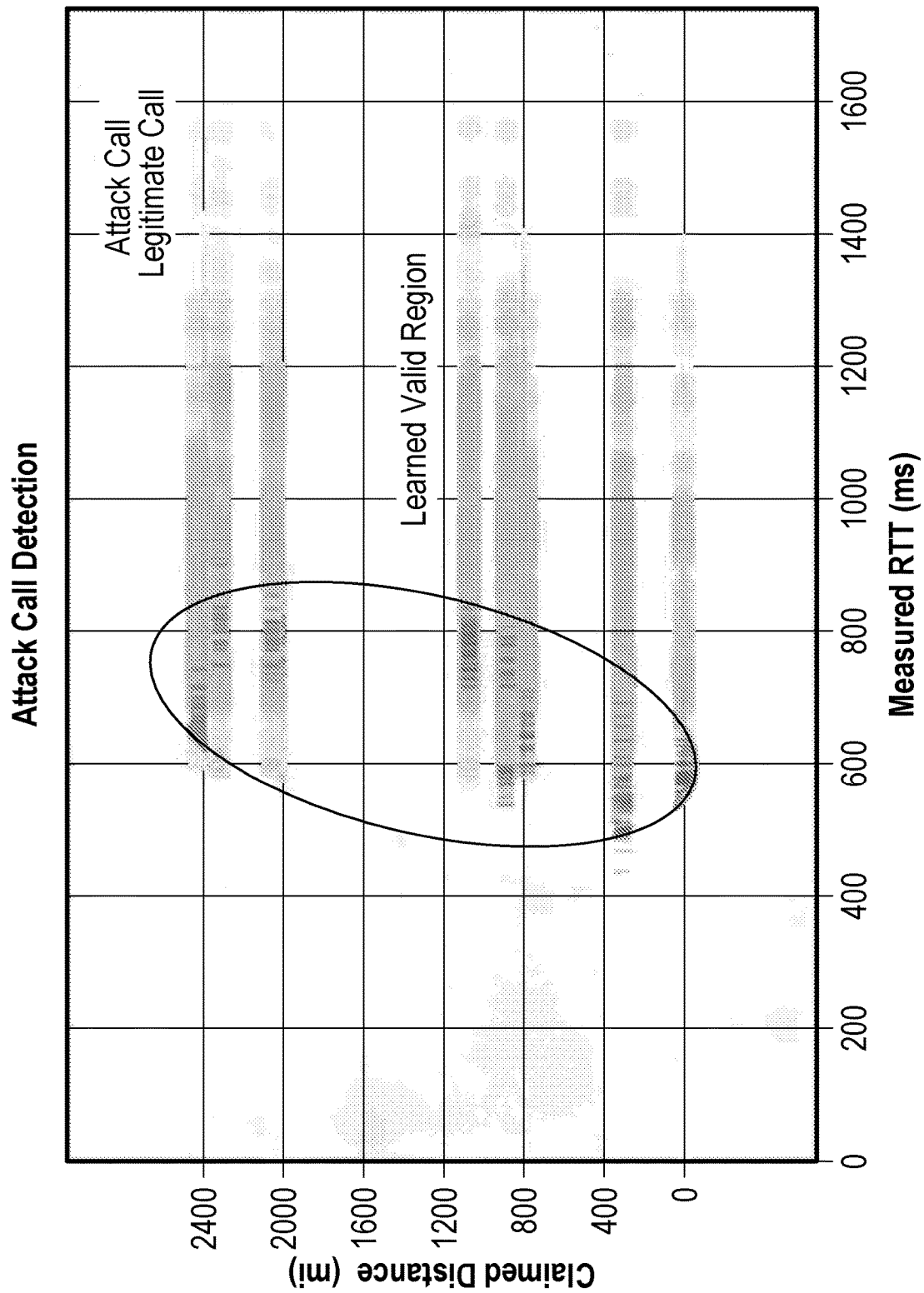
FIG. 11 is a depiction of a graph generated by the classifier. The calls that fall within the area inside the oval are the calls categorized as legitimate calls, while those outside are the calls the classifier deemed as attacked calls. As illustrated, the classifier was able to detect redirection attacks with a false positive rate of 0%.
Figure 12:
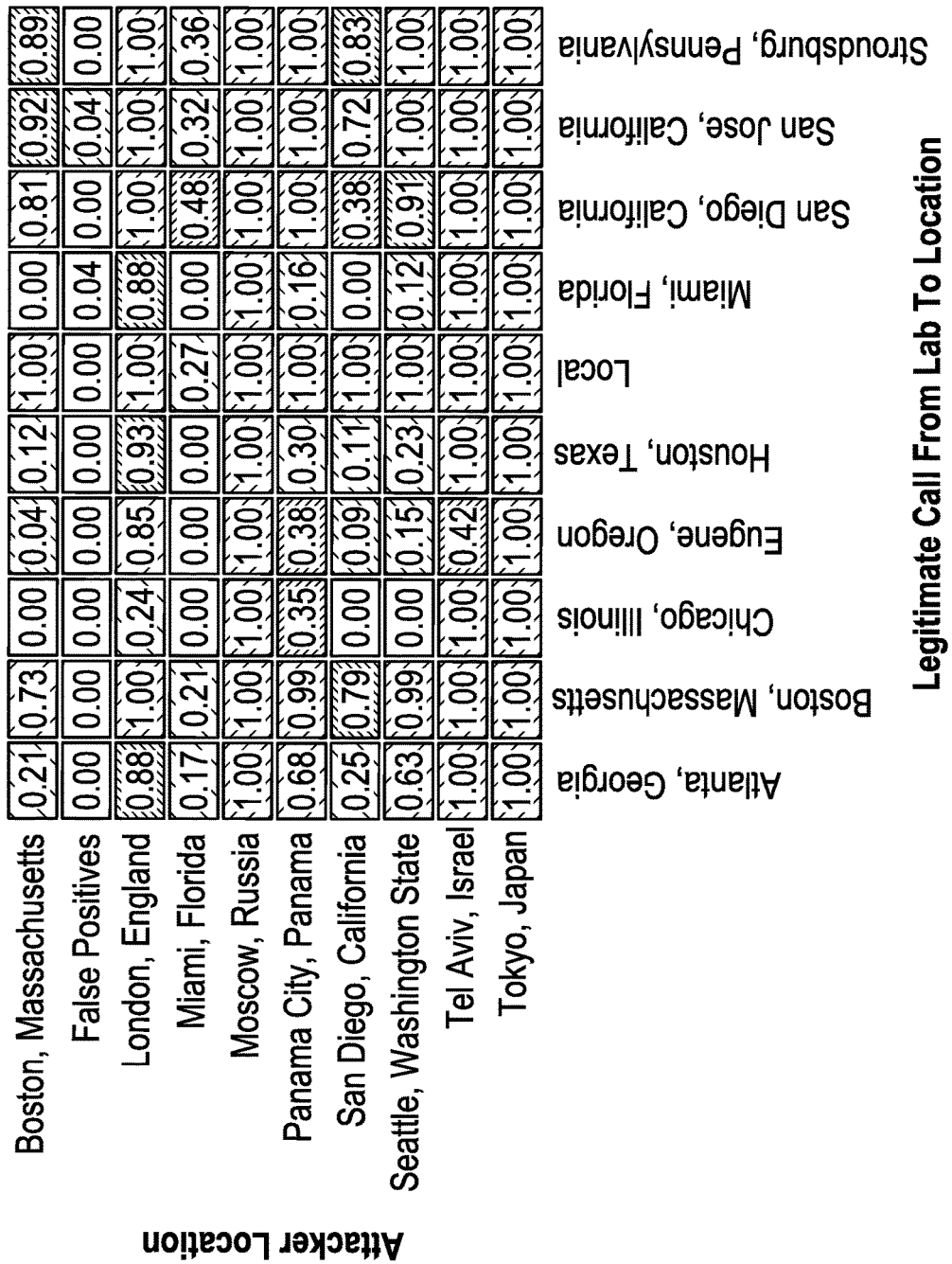
FIG. 12 is a table illustrating detection accuracy. The shade of colors correlates the accuracy of the classifier to detect an attack.

FIG. 11 shows the raw plot of RTT versus the claimed great-circle distance (which does not include any additional distance gained by redirection) for legitimate and attack calls. Note that in SONAR the verifier knows the distance the call should take (the claimed distance) and measures the actual RTT. The oval region indicated on the graph is the decision boundary learned by the classifier; points outside that region are classified as attack calls. For all calls this resulted in a true positive rate of 70.9% and false positive rate of 0.3%. Because the claimed destination of the call was already known, however, these rates can be broken down by expected destination. FIG. 12 shows the detection rate based on the expected destination of the call and the attacker's location.

Intuitively, calls redirected to an attacker nearby the expected destination results in both lower detection rates, as well as false positive rates. This is due to the increase in call distance being relativity low and therefore causing the RTT to only increase slightly or in some extreme causes stay relatively the same. For example, when calling San Diego, Calif. from an anonymized location, the presence of an attacker in Boston, Mass. will be easier to detect (81% detection accuracy) than in Miami, Fla. (48% detection accuracy). This is because the distance between the anonymized location and Boston, Mass. is greater than that between the anonymized location and Miami, Fla. Furthermore, international calls have the highest detection rates in the data set which is, in part, due to distance. 100% of attacks from Tokyo and Moscow were able to be detected. Overall, what this figure shows is that there is a direct correlation between distance and detection rate.

Finally, extra data to further validate the classifier against calls attacked by foreign adversaries was collected. The goal was to validate the model for locations outside of those used in the training set. In addition to the previous attack locations, these new attack points (Sydney, Singapore, Sao Paulo, Kiev, Chennai, and Cape Town) were taken when the audio loopback device was in Houston and Miami. The classifier that was trained with the original larger data set was used with these additional RTTs to see whether the classifier would correctly predict all of these calls as attacked. The classifier was able to predict the attack calls with 100% accuracy (0% false positive), as shown in FIG. 13.

Overall, these results confirm the hypothesis that that redirected calls can be detected using round trip time measurements.

Figure 14:
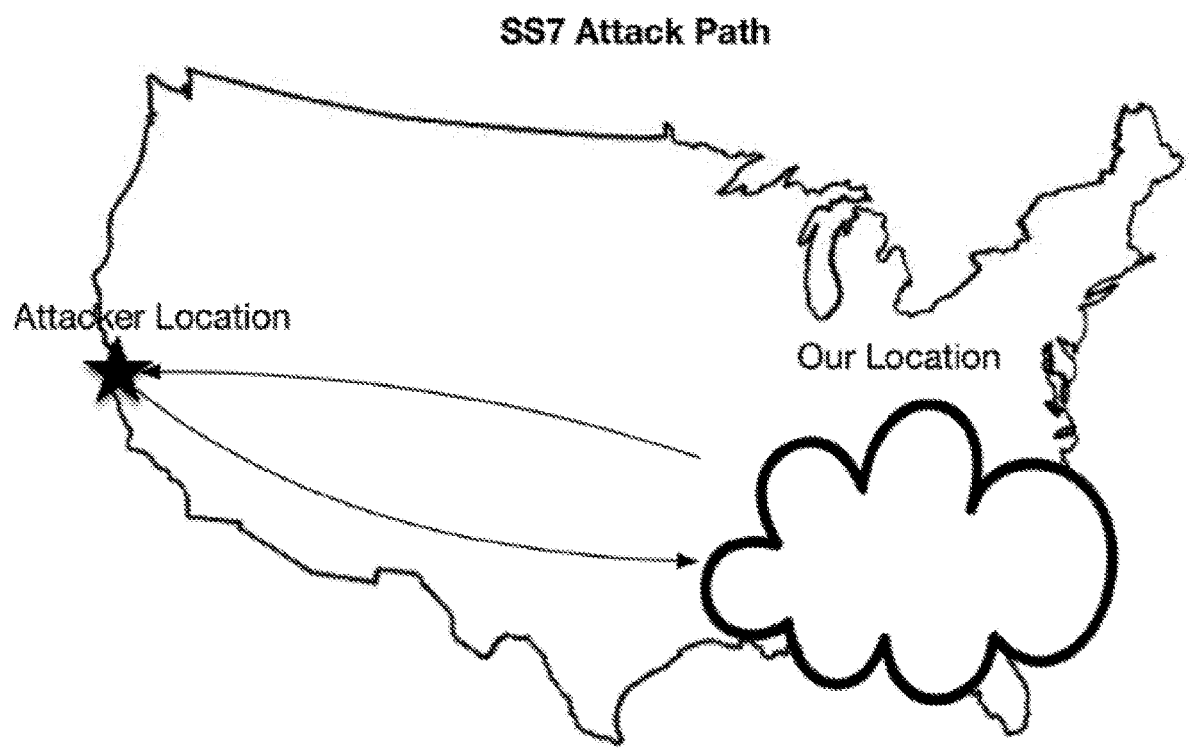
FIG. 14 depicts the path a call must travel when an actual SS7 rerouting attack was executed. The cloud anonymizes the experimental data.

To observe how real SS7 attacks impact the RTT of call audio, an anonymous telecommunications company with the capability to execute actual SS7 call rerouting participated in an experiment. As previously mentioned, SS7 rerouting attacks can be illegal without proper approval. Only approved research devices were targeted in these experiments. When called with the echoing device used in previous experiments the call is rerouted to San Francisco via SS7 before reaching its intended destination. The route the call travels is presented graphically in FIG. 14.

Figure 15:
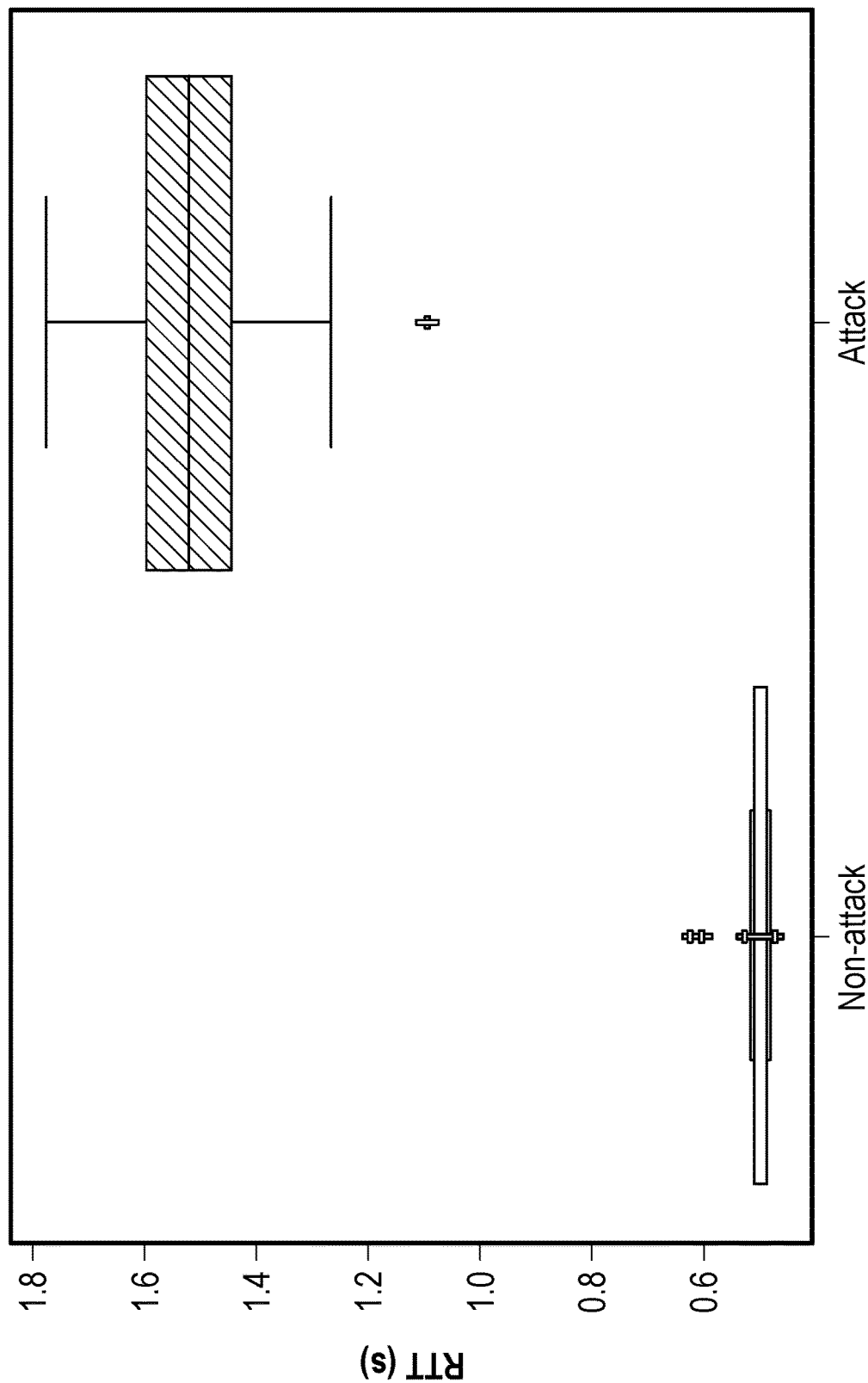
FIG. 15 is a graph depicting RTT data collected over a two day period for an actual SS7 rerouting attack compared to RTT data for the same experimental setup without rerouting taking place. There is a clear distinction in the RTT values for legitimate and rerouted calls.

We collected RTT data for 50 calls, 25 of which experienced rerouting. To determine if the two groups are statistically different, a power analysis was performed on the data. This analysis tells to what degree attack calls and non-attack calls are statistically different. With a ρ<0:001, a power of 1.0 was obtained. Using the findings and the same ρ-value, a required sample size of at least 10 calls per group was computed. The analysis yielded that the attack and non-attack calls are statistically different in terms of RTT. The data points were plotted, which can be seen in FIG. 15. From this one is able to see that the there is a difference of 466 ms between the two groups.

The results of the RTT added by actual SS7 rerouting attacks differ from the attack emulations, in that the emulations actually have a much lower RTT. On average, an actual SS7 rerouting attack to San Francisco added an additional second to the average legitimate call RTT. This is higher than the average time introduced by rerouting to Moscow, Tokyo, or Tel Aviv in the testbed. The reason that the time introduced by actual SS7 rerouting is significantly higher than the testbed is due to additional hardware that calls must go through. Actual SS7 rerouting attacks require the call audio to traverse additional hardware such as service switching points, signal transfer points, and service control points. These add latency to the call before it researches its true destination. Geographic and technological concerns prevent one from determining the exact time introduced by additional SS7 hardware and audio stacks at the network level.

The anonymous company only had the ability to reroute calls to San Francisco, and because of this these attack values alone could not be used to evaluate the effectiveness of the system. The attack simulation data continues to be used, representing a worst case scenario for time introduced by SS7 rerouting. This reflects the adversary introducing a much lower RTT through SS7 redirection, similar to that of a VoIP redirection attack. This worst case scenario also accounts for variance in time introduced by the SS7 network hardware. However, the real SS7 rerouting attack data allows one to conclude that with more actual attack data one will find that one can effectively detect a percentage of domestic SS7 rerouting attacks in addition to international SS7 rerouting attacks.

This simulation is a conservative estimate of actual SS7 rerouting attacks in terms of RTT and because of such, is a worst case scenario for rerouting detection.

Figure 16:
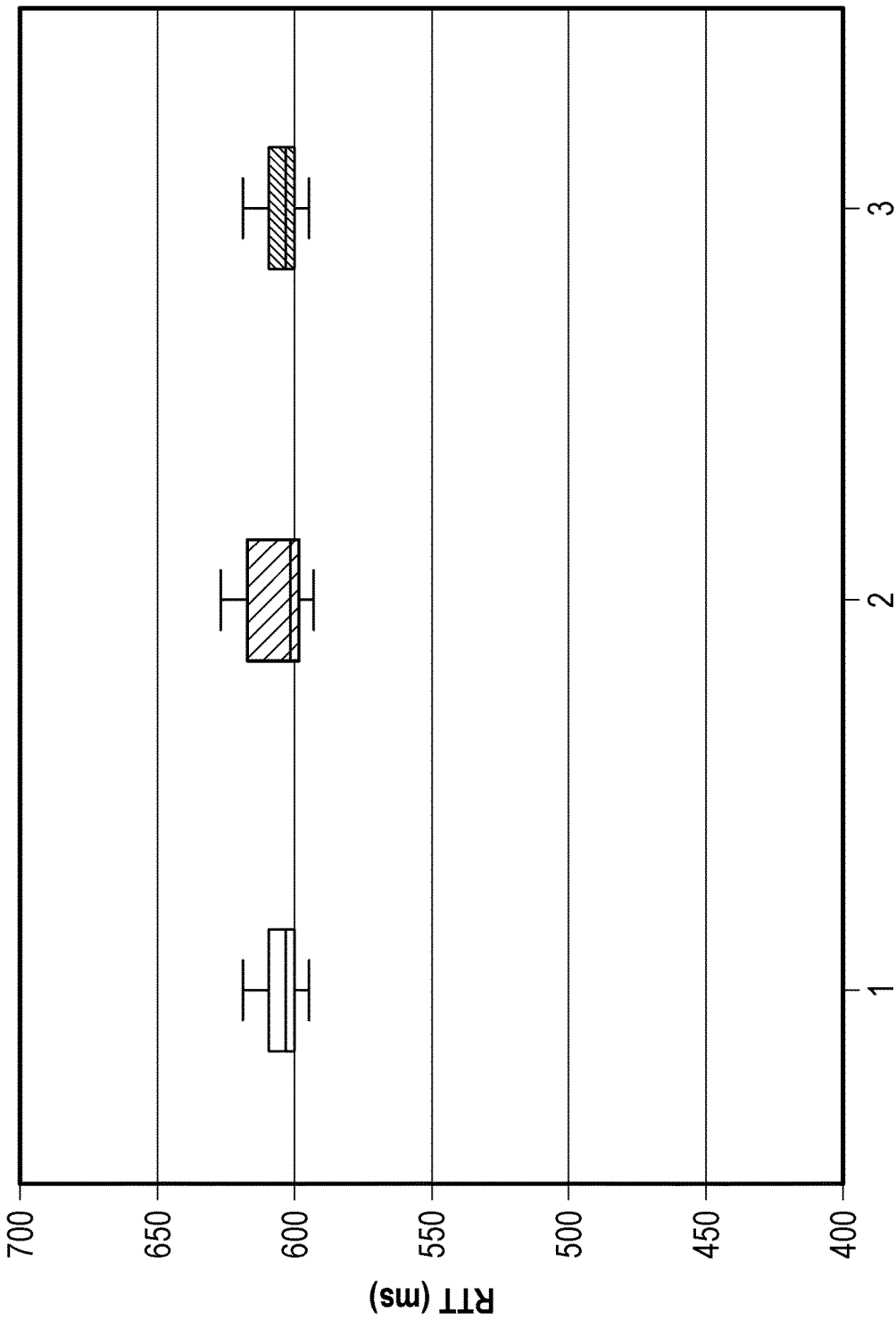
FIG. 16 is a graph depicting a variation in recorded audio RTTs between Applicant's lab and Boston, Mass. collected over a two day period. These experiments demonstrate that very little variation was seen between tests at different times of day.

Variations in RTTs occur regularly in networks. These differences are generally the result of network traffic conditions and variations in routing paths. Extensive work has been done in the network measurement communities to characterize such variations in both traditional and cellular data networks. We this is not a comprehensive study, the results are a reasonable approximation of normal network conditions in systems with circuit switched or circuit switched-like behavior. FIG. 16 is a box plot representing three sets of audio latency tests collected over a two day span. These tests were conducted between GSM devices in a lab and Boston, Mass., and represent collection during a Sunday evening, Monday morning and Monday evening. This small study confirms that very little variation was seen during testing.

The results showed that RTT was sufficient to determine that a call is likely rerouted, but that RTT was insufficient to actually determine the location of the other party. While the current threat model assumes mutually trusted parties, phone calls are often used among parties that may not initially trust each other, and having accurate location measurement would allow one to relax SONAR's trust assumptions.

Accurate determination of location is hindered by a number of factors, prime of which is that RTT is a scalar value that can only resolve distance, not position. As a result, accurate and reliable RTT measurements from multiple positions on the globe would be necessary to triangulate the position of a caller. Because a call party can only be in one place at a time, such triangulation is not possible with a single point-to-point call. One possibility would be for a group of mutually trusting collaborators to sequentially call a proving party to provide triangulation measurements. However, because an adversary with the ability to redirect calls can simply choose to not delay some of the triangulation calls, the adversary has a significant amount of power to influence the measurement. A second issue is that distance bounding only guarantees a lower bound, not an upper bound; a dishonest prover could add delay to change their triangulation.

An appealing option might be to leverage conference calls so that all triangulating parties are on the same call concurrently. Unfortunately, in most telephone systems conference calls are implemented using a hub-and-spoke model, where either all calls are placed to a central bridge or a single call party acts as the meeting point for all other callers. This means that a group of collaborators could conceivably bound the distance to the conference bridge, but only if that bridge responded honestly to all verifiers.

It may be possible to use other features besides RTT to localize a caller. For example, it may be possible to use systems that learn noise characteristics of phone calls in various locations to locate a caller with reasonable accuracy. However, such techniques would require exhaustive global characterization, making them impractical at scale. While delay is unlikely to be useful for localization, future work may lead to other techniques for call localization.

Calls are not the only flows that can fall victim to SS7 redirection attacks. As mentioned previously, SS7 is also responsible for routing text messages (i.e., SMS). In fact, a recent major attack on second factor authentication tokens sent from the financial industry via SMS was believed to be executed using SS7 redirection. Similar attacks were also discussed in recent related work.

SONAR detects SS7 redirection attacks by measuring latency over the audio channel, a feature not available to text messages. However, it is not simply the lack of an audio channel that makes this particular attack difficult to detect. SMS is an asynchronous service with no real-time delivery guarantees. As such, any attempt to measure its delay as a means of detecting redirection would be noisy at best. The best course of action for messages with sensitive content is to therefore transmit them only over secure channels or use secure messaging applications.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

We claim:

1. A system, comprising:
   a first computing device comprising a processor and a memory; and
   machine readable instructions stored in the memory that, when executed by the processor, cause the first computing device to at least:
      send a first location of the first computing device to a second computing device;
      receive, from the second computing device, a second location of the second computing device;
      generate a first pseudorandom bitstream;
      send a first bit from the first pseudorandom bitstream to the second computing device;
      start a timer in response to the first bit from the first pseudorandom bitstream being sent to the second computing device;
      receive, from the second computing device, a second bit from a second pseudorandom bitstream;
      stop the timer in response to receipt of the second bit from the second pseudorandom bitstream;
      store the received second bit and a length of time recorded by the timer; and
      determine that a Signaling System 7 (SS7) redirection attack is occurring to a telephonic connection between the first computing device and the second computing device based at least in part on the received second bit being incorrect and the length of time recorded by the timer being greater than an expected length of time based at least in part on a distance between the first location of the first computing device and the second location of the second computing device.

2. The system of claim 1, wherein:
   the length of time recorded by the timer is one of a plurality of lengths of time recorded by the timer; and
   the machine readable instructions, when executed by the processor, further cause the first computing device to at least:
      average together each the plurality of lengths of time recorded by the timer to generate an average round trip time (RTT); and determine if the average RTT is within a predefined range.

3. The system of claim 2, wherein the machine readable instructions, when executed by the processor, further cause the first computing device to trigger an alert in response to a determination that the average RTT is outside of the predefined range.

4. The system of claim 1, wherein:
the received second bit is one of a plurality of received bits; and
the machine readable instructions, when executed by the processor, further cause the first computing device to at least determine that each bit in the plurality of received bits is correct.

5. The system of claim 4, wherein the machine readable instructions, when executed by the processor, further cause the first computing device to trigger an alert in response to a determination that at least one bit among the plurality of received bits is incorrect.

6. The system of claim 1, wherein the machine readable instructions, when executed by the processor, further cause the first computing device to negotiate a session key with the second computing device.

7. The system of claim 6, wherein the machine readable instructions that cause the first computing device to generate the first pseudorandom bitstream cause the first computing device to generate the first pseudorandom bitstream based at least in part on the session key.

8. The system of claim 6, wherein the second pseudorandom bitstream is based at least in part on the session key.

9. A computer-implemented method performed by a first computing device, comprising:
sending a first location of the first computing device to a second computing device;
receiving, from the second computing device, a second location of the second computing device;
generating a first pseudorandom bitstream;
sending a first bit from the first pseudorandom bitstream to the second computing device;
starting a timer in response to the first bit from the first pseudorandom bitstream being sent to the second computing device;
receiving, from the second computing device, a second bit from a second pseudorandom bitstream;
stopping the timer in response to receipt of the second bit from the second pseudorandom bitstream;
storing the received second bit and a length of time recorded by the timer; and
determining that a Signaling System 7 (SS7) redirection attack is occurring to a telephonic connection between the first computing device and the second computing device based at least in part on the received second bit being incorrect and the length of time recorded by the timer, and the being greater than an expected length of time based at least in part on a distance between the first location of the first computing device and the second location of the second computing device.

10. The computer-implemented method performed by the first computing device of claim 9, wherein:
the length of time recorded by the timer is one of a plurality of lengths of time recorded by the timer; and
the method further comprises:
averaging together each the plurality of lengths of time recorded by the timer to generate an average round trip time (RTT); and
determining if the average RTT is within a predefined range.

11. The computer-implemented method performed by the first computing device of claim 10, further comprising triggering an alert in response to a determination that the average RTT is outside of the predefined range.

12. The computer-implemented method performed by the first computing device of claim 9, wherein:
the received second bit is one of a plurality of received bits; and
the method further comprises determining that each bit in the plurality of received bits is correct.

13. The computer-implemented method performed by the first computing device of claim 12, further comprising triggering an alert in response to a determination that at least one bit among the plurality of received bits is incorrect.

14. The computer-implemented method performed by the first computing device of claim 9, further comprising negotiating a session key with the second computing device.

15. The computer-implemented method performed by the first computing device of claim 14, wherein generating the first pseudorandom bitstream is based at least in part on the session key.

16. The computer-implemented method performed by the first computing device of claim 14, wherein the second pseudorandom bitstream is based at least in part on the session key.

17. A first mobile phone comprising a processor, a memory, and machine-readable instructions stored in the memory, the machine-readable instructions, when executed by the processor, causing the first mobile phone to at least:
determine a distance between the first mobile phone and a second mobile phone;
negotiate a session key with the second mobile phone;
generate a first pseudorandom bitstream;
send at least one bit from the first pseudorandom bitstream to the second mobile phone;
measure a time from when the at least one bit was sent to the second mobile phone to when a respective at least one bit from a second pseudorandom bitstream is received from the second mobile phone; and
determine that a Signaling System 7 (SS7) redirection attack is occurring based at least in part on the respective at least one bit from the second pseudorandom bitstream being incorrect and a length of the time from when the at least one bit was sent to the second mobile phone to when the respective at least one bit from the second pseudorandom bitstream is received from the second mobile phone being greater than an expected length of time based at least in part on the distance between the first mobile phone and the second mobile phone.

18. The first mobile phone of claim 17, wherein the at least one bit from the first pseudorandom bitstream is sent to the second mobile phone via an audio connection between the first mobile phone and the second mobile phone.

19. The first mobile phone of claim 17, wherein the respective at least one bit from the second pseudorandom bitstream is received from the second mobile phone via an audio connection between the first mobile phone and the second mobile phone.

20. The first mobile phone of claim 17, wherein a determination of the distance between the first mobile phone and the second mobile phone is based at least in part on a location of the second mobile phone, wherein the first mobile phone is configured to receive the location of the second mobile phone over a secure communications channel.

* * * * *